United States Patent [19]

Laitinen

[11] Patent Number: 5,862,383
[45] Date of Patent: Jan. 19, 1999

[54] GENERATION OF CODE BY GRAPHICAL REPRESENTATION

[75] Inventor: Petri Paavo Laitinen, Helsinki, Finland

[73] Assignee: Nokia Research Center, Nokia Group, Finland

[21] Appl. No.: 757,296

[22] Filed: Nov. 27, 1996

[51] Int. Cl.$^6$ .................................................. H03M 7/00
[52] U.S. Cl. .......................................... 395/708; 395/680
[58] Field of Search .................................. 395/701, 708, 395/702; 455/508, 426, 445; 379/267

[56] References Cited

U.S. PATENT DOCUMENTS

| | | | |
|---|---|---|---|
| 5,335,358 | 8/1994 | Sherburne et al. | 455/508 |
| 5,371,492 | 12/1994 | Lohrbach et al. | 340/825.03 |
| 5,574,725 | 11/1996 | Sharma et al. | 370/426 |
| 5,577,041 | 11/1996 | Sharma et al. | 370/271 |

Primary Examiner—Emanuel Todd Voeltz
Assistant Examiner—Matthew Smithers
Attorney, Agent, or Firm—Perman & Green, LLP

[57] ABSTRACT

A method and system generate code capable of driving a digital signal processor in a communications system, operative in response to constraints of signal transmission protocol. The method and system employ a computer having a display presenting a series of blocks representative of elements of a message. Data entered into the computer includes identification of various message elements for inclusion in respective ones of the blocks on the display. This provides for a graphical representation of bit streams having the protocol and the syntax. The entered data further includes protocol and syntax constraints to be employed by the communications system for transmission of the messages. The computer is operative to convert the graphical representation to a set of declarations in accordance with a declarative form of Transfer Syntax Notation (TSN) language. Also included is a data processor which runs a TSN program to convert the declarative form of the TSN language to an imperative form of the TSN language. Thereupon, a compiler of the imperative form of the TSN language outputs a host language, the host language being convertible to machine language for operation of the digital signal processor.

11 Claims, 3 Drawing Sheets

ID

GENERATION OF CODE BY GRAPHICAL REPRESENTATION

BACKGROUND OF THE INVENTION

This invention relates to protocols employed in the transmission of messages such as telephonic control signals of a communication system and, more particularly, to the generation of a set of instructions for operation of the digital signal processor of a radio telephone for encoding and decoding telephonic command signals in various protocols.

Communication via radiotelephone is in wide use today for both domestic and international communication. In order to enable telephones in various countries to communicate, international standards of communication protocols have been developed. The protocols establish the digitally formatted signals transmitted among radiotelephones and their respective base stations via control channels for various control purposes, such as for dialing a distant party and for initiating a conversation. Implementation of a protocol is accomplished by programming the digital signal processor (DSP) of a radio telephone to encode outgoing telephone control signals in accordance with the protocol and to decode incoming telephone control signals in accordance with the protocol. While the foregoing example is in terms of a radio or cellular telephone system, similar uses of protocol apply to other forms of communication systems.

A problem arises in that the programming of a computer, such as the computer in a DSP, to accomplish the encoding and decoding functions of a specific protocol is a long and cumbersome task involving many hours of a programmer's time. Thus, in the event that a proposed improvement to a communication system is to be accomplished by a change of the protocol, there is considerable expense and effort involved in the reprogramming of the DSP or other computer which performs the encoding and the decoding functions.

SUMMARY OF THE INVENTION

The aforementioned problem is overcome and other advantages are provided by a method and system of the invention employing a graphical representation of protocol and syntax of a communication language (such as the well known international language ASN.1) together with a programming language referred to as Transfer Syntax Notation (TSN). TSN is a programming language useful for treating data transmitted by the bits of a sequence of bytes having equal bit length as is employed in the ASN.1 language, and can be compiled to both encoding and decoding functions of a communication system, such as a telephone communication system. In accordance with the invention, the graphical representation of protocol and syntax of the communication language together with the TSN language facilitate the programming of a computer for performing the functions of encoding and decoding as required by international protocol. The invention is most readily explained by consideration of some of the elements present in the messages transmitted by digital control channels of a radiotelephone system.

A control channel message comprises a set of words, wherein each word consists of one, two, three, or more binary digits or bits. The transmission of the message takes place by a transmission of a series of bytes wherein each byte comprises usually eight bits and may be referred to as an octet. Thus one byte may carry one or more words or a fraction of a word. For example, in the case of a word of twelve bits, the word would extend from one byte into the next byte. The protocol dictates various attributes of the message, such as the lengths of various words, the positions of individual ones of the words in a sequence of the words, the use of an extension bit to indicate that a word extends into the next byte, and the use of diagnostic words, by way of example. A change in protocol is accomplished, by way of example, by adding additional words, deleting words, changing the length of words, and changing the order of words.

In the programming of the DSP, or other computer used in control of a communication, there is a program memory for storing the program. The various words and their lengths are to be identified, and their order is to be established. In the case of an outgoing message, the DSP, in response to its programming, encodes information in a sequence of octets (data), with the logic states of the individual bits being established according to data, such as a dialed number, and system operating parameters as may be established by the local telephone company. In the case of an incoming message, the DSP, in response to its programming, decodes the digital bit stream of the control channel by recognizing various octets and identifying the logic states of the various digits in the bit stream.

In accordance with the invention, it is recognized that in all of the messages to be communicated by the various protocols, the protocols share a common feature in that each message is composed as a sequence of octets wherein various ones of the bits are designated for specific words. A change in protocol involves only a change in the allocation of the bits which constitute the various words. As a result, it has been possible to develop a compiler which outputs the encoding and decoding programs. The compiler accepts a series of logic statements describing the protocol, and then generates the machine code program steps for operation of the DSP. The one compiler can handle the encoding and decoding of all of the protocols which can be described by use of TSN primitives. Thus, in order to adapt a DSP to operate with a new or revised protocol, the logic statements describing the protocol are entered into the compiler which then operates to output the desired set of instructions for operation of the DSP.

The logic statements are in the form of constraints which specify the length of a message or data frame or word, by way of example. This permits entry of the logic statements in a simplified manner, in accordance with a further feature of the invention, by use of a computer display showing an arrangement of blocks into which the values of the constraints are entered. Thereby, the constraints of the logic statements describing the protocol are entered into the compiler. In the arrangement of the blocks, the locations of various ones of the blocks facilitate visualization of the various constraints, such as the order of the words in a message, thereby to facilitate generation of the logic statements and entry of the values of the various constraints.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element but may not be referenced in the description for all figures.

DETAILED DESCRIPTION

Figure 1:
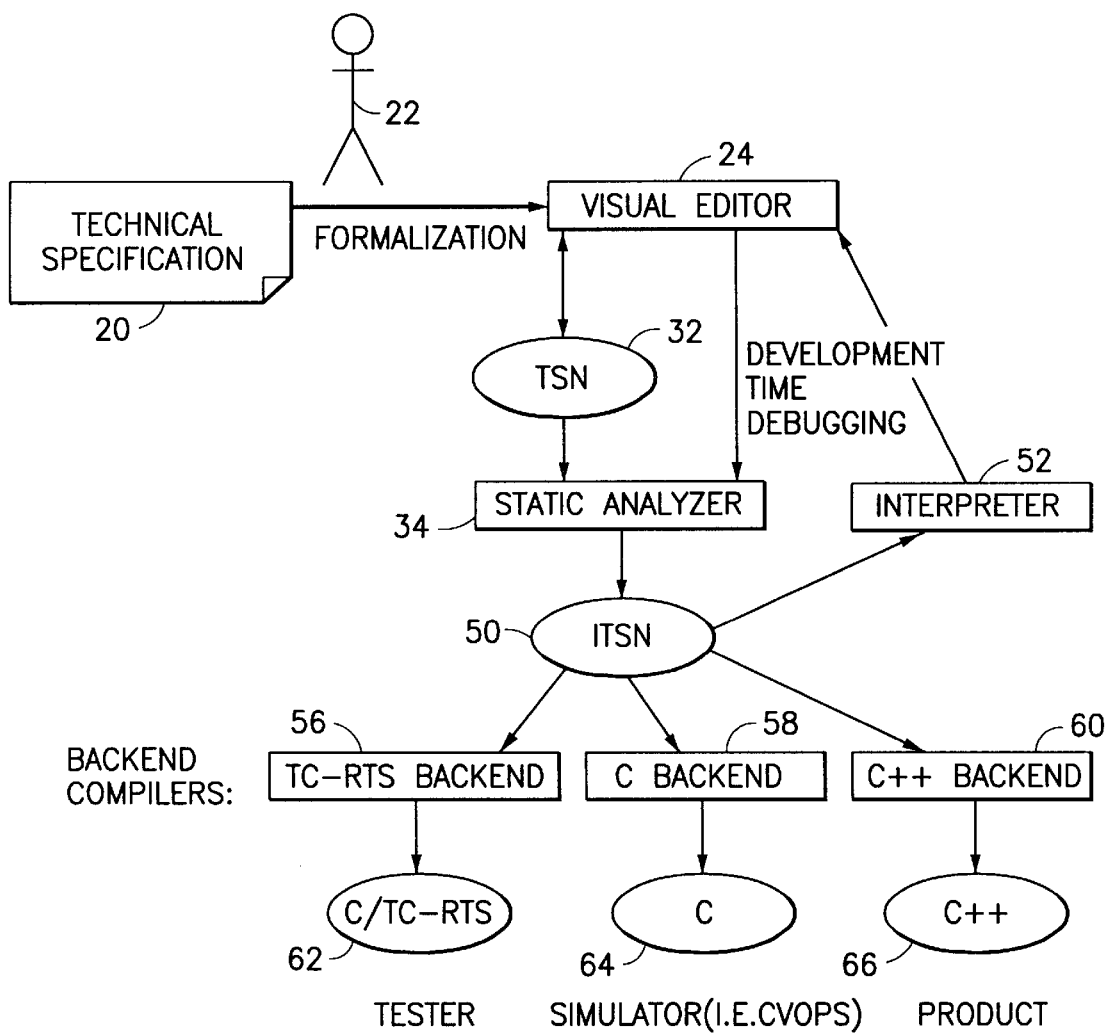
FIG. 1 shows diagrammatically various steps in the procedure for practicing the invention.
Figure 2:
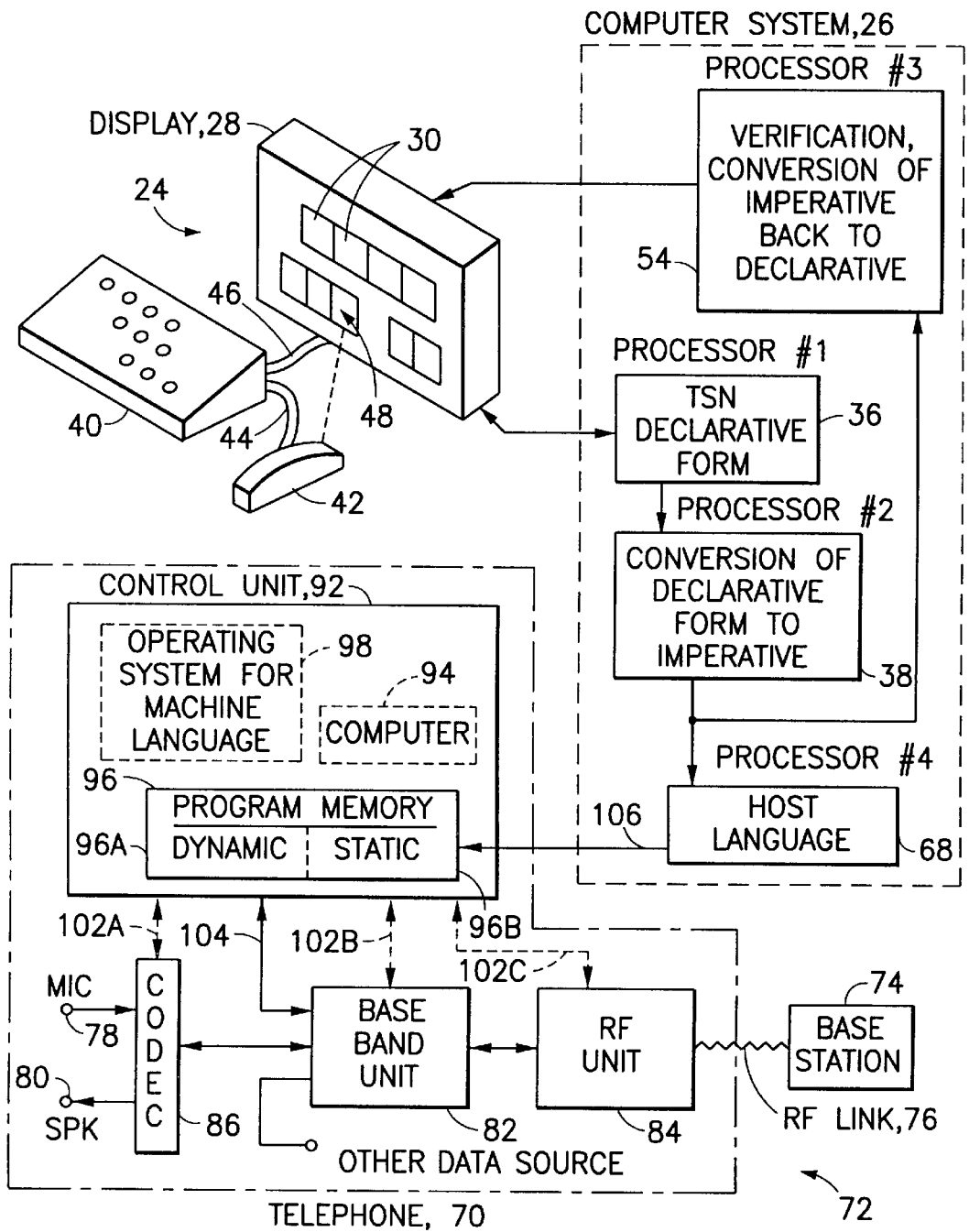
FIG. 2 is a block diagram showing implementation of the invention for use in control of a telephonic instrument of a communication system, a cellular telephone being shown by way of example.

FIGS. 1 and 2 present, respectively, methodology and apparatus in the conduction of the invention. The invention deals with the generation of instructions for insertion into a program memory of a communication device, thereby to enable the device to transmit and to receive messages in accordance with a protocol previously established for a communication system. The invention is applicable to any of various communication devices having an internal computer or digital signal processor which controls response of a communication device in the generation of messages to be transmitted, particularly the encoding of transmitted messages, and for the interpretation of messages to be received, particularly the decoding of received messages. A cellular telephone is a common example of a suitable communication device and will be employed hereinafter for describing the construction of the invention. A particular feature of the invention is the enablement of a programmer who is knowledgeable of the technical specifications governing a communication to convert the technical specifications to a programming language for operation of the DSP of the communication device. The conversion of the technical specifications to the programming language is implemented by means of a graphic interface which facilitates the conversion process.

The technical specifications concern the communication protocol specifications which control the encoding and the decoding functions of the communication device. The invention is practiced by the development of a specification language which is referred to hereinafter as a Transfer Syntax Notation (TSN) which can be compiled automatically to both encoding and decoding functions with corresponding data structure definitions needed for translation between bit oriented protocol data units (PDU's) and an internal programming language. The internal programming language is described by standard language, Abstract Syntax Notation One (ASN.1), as set forth in the international communication standard ISO8824. The system of the invention operating with the TSN in conjunction with appropriate code generators may be used, by way of example, for rapid implementation of executable TTCN-test suites and communication protocols, wherein TTCN is set forth in the international communication standard ISO9646.

An aspect of the ASN.1 language is the use of constraints in terms of the length of bytes, the length of words, and the arrangement of words within a message, by way of example. Thus, programming a DSP to encode a message and to decode a message in accordance with the ASN.1 language entails a form of programming known as constraint programming. The concept of constraints suits well to the two part problem of specifying encoding and decoding functions for a mapping between bit oriented transfer syntax and internal standard of the communication protocol. The constraint programming lends itself to an expressive form of codec functions describable in a set of declarative expressions. This can be expressed in the form of a graphical interface wherein a programmer enters data and constraints to be employed in the development of the encoding and decoding functions. The TSN language implemented in a compiler generates accurate substitutions to encoding and decoding functions by analyzing the constraints in an abstract domain. This is readily adapted for providing the requisite encoding and decoding programs for various communication devices.

Figure 3:
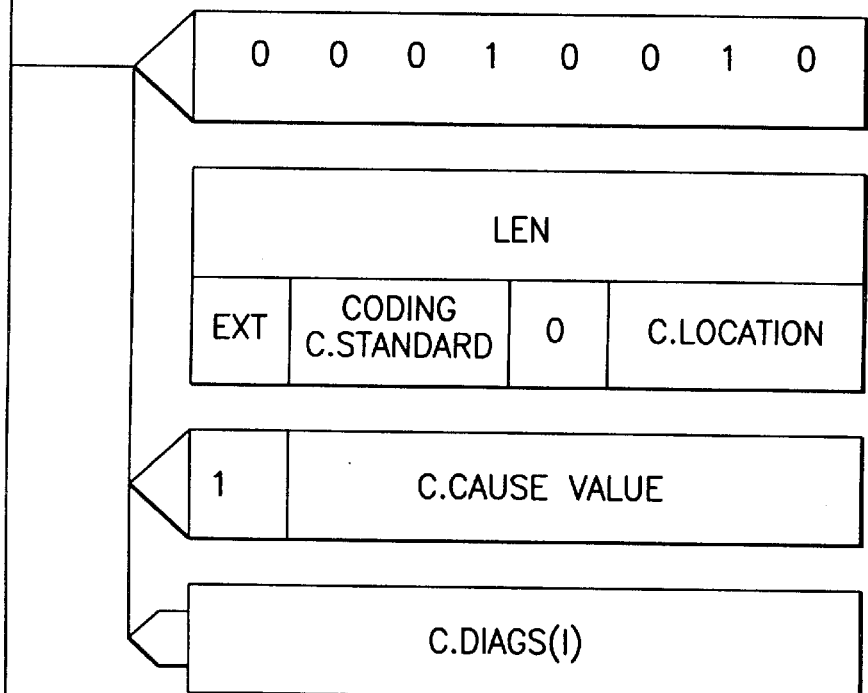

With reference to FIG. 1, the technical specification, shown at block 20, is employed by a programmer 22 in the operation of a visual editor 24 for implementing the procedure of the invention with the TSN language to produce the encoding and decoding instructions for use by a DSP of a communication device, such as a telephone. FIG. 2 shows the visual editor 24 connected to a computer system 26 for implementing the functions of the visual editor 24. The visual editor 24, as shown in FIG. 2, comprises a display 28 presenting rectangular arrays of cells 30 wherein individual ones of the cells may vary in length to accommodate descriptive terminology and/or bits of words to be employed in setting up the constraints for implementation of the TSN compiling. FIG. 3 shows a further presentation on the visual editor display 28 which, by way of example, includes several lines of both binary digits and descriptive terminology useful in presenting Cause indicators information element in the ISDN user part communication protocol as set forth in the International Communication Specification Section Q.761–Q.764.

As shown in FIG. 1, the visual editor 24 is employed to enter the appropriate constraints into the TSN language, indicated at block 32. From block 32 the TSN expressions are processed in accordance with the functions of a static analyzer as indicated at 34. The functions of the static analyzer 34 are implemented, as shown in FIG. 2, by a first processing section 36 and a second processing section 38 of the computer system 26 wherein the first processing section 36 provides the declarative form of the TSN language based on inputted quantities at the visual editor 24. By way of example, the visual editor 24 may include a keyboard 40 and a mouse 42 interconnected to each other by an electrical signal cable 44 and connected to the display 28 via an electrical signal cable 46 for inserting the requisite data into the visual editor 24. The mouse 42 may be employed to position a cursor 48 to designate a cell 30 wherein data is to be entered via the keyboard 40. This data, after having been entered into the declarative form of the TSN of the first processing section 36 is then applied to the second processing section 38 to convert the declarative form of the TSN language to an imperative form of the TSN language.

With reference to FIG. 1, the imperative form of the TSN language is identified as ITSN at block 50. Debugging of the TSN programming is accomplished by implementing the functions of an interpreter shown at 52, the interpreter 52 being connected between block 50 and the visual editor 24.

The function of the interpreter 52 is to convert back from the imperative form to the declarative form of the TSN language, and to produce the initial data on the display 28 (FIG. 2) so that the programmer 22 can compare the inputted data and the regenerated data to insure that the conversion between the declarative and the imperative forms of the TSN language is accomplished correctly. The function of the interpreter 52 is accomplished by a third processing section 54 (FIG. 2) of the computer system 26. The third processing section 54 is connected between an output port of the second processing section 38 and the display 28 to enable the inputting of the imperative form of the TSN language to the third processor processing section 54, and an outputting of the data in a form recognizable by the programmer 22 from the display 28.

As shown in FIG. 1, a set of back-end compilers 56, 58, and 60 are employed for converting the ITSN language at block 50 to common programming languages, including C++, as shown at blocks 62, 64, and 66. Any one of the languages outputted by the back-end compilers 56, 58, and 60 may be referred to as a host language, the host language being suitable for operating the DSP of a communications device. The function of back-end compiling is provided by a fourth processing section 68 (FIG. 2) which receives the output of the second processing section 38 and outputs the desired host language. With respect to the back-end compiler 56, its host language is suitable for testing in accordance with the run-time system (RTS) wherein TC is a compiler for TTCN test description language as set forth in international communication specification ISO9646. The back-end compiler 58 produces C language suitable for simulation purposes, such as CVOPS simulation. The back-end compiler 60 produces the C++ language which is intended for operation of the product such as the cellular telephone 70 of FIG. 2. The four processing sections 36, 38, 54, and 68 may be constructed as separate modules, or may be part of a single computer programmed to provide the respective functions.

With reference to FIG. 2, a communication system 72 is represented by a base station 74 communicating via an RF (radio frequency) link 76 to the aforementioned cellular telephone 70. The telephone 70 includes a microphone 78 and a speaker 80, respectively, for enabling a person to speak into the telephone 70 and to hear sounds from the telephone 70. The telephone 70 further comprises a baseband unit 82, an RF unit 84, a codec 86 and a control unit 92. The control unit 92 may be formed as a digital signal processor, and includes a computer 94 with a memory 96 having both a dynamic memory section 96A and a static memory section 96B. An operating system 98 for the computer 94 is included within the control unit 92.

In the operation of the telephone 70, the codec 86 serves to convert audio signals of the microphone 78 into digital signals which are inputted to the baseband unit 82. The baseband unit 82 provides for encoding and multiplexing of speech signals from the microphone 78, as well as data from another source 100 such as, by way of example, possibly a fax machine or a computer modem. Outgoing signals from the telephone 70 are coupled from the baseband unit 82 to the RF unit 84 to be placed on a suitable outgoing carrier at an outgoing carrier frequency for transmission via the RF link 76 to the base station 74. Signals received from the base station 74 via the link 76 to the RF unit 84 are converted from an incoming carrier frequency down to a baseband signal frequency by the RF unit 84 and are applied to the baseband unit 82. The incoming signals to the telephone 70 are demultiplexed and decoded by the baseband unit 82 to obtain the voice signal which is applied to the codec 86 and converted to analog format for presentation to the speaker 80. Internal control signal lines 102A, 102B, and 102C provide for control, respectively, of the codec 86, the baseband unit 82, and the RF unit 84 by the control unit 92. Specific instructions in the form of code for the operation of the baseband unit 82, in accordance with requisite protocol for transmission of signals via the communication system 72, are applied by the control unit 92 to the baseband unit 82 by a control line 104.

Instructions for the encoding and the decoding functions, as provided by the host language in the fourth processing section 68 of the computer system 26, are outputted by the fourth processing section 68 via line 106 to the static memory section 96B of the program memory 96 of the control unit 92. The memory 96 stores a program for operation of the computer 94. In the event that the control unit 92 has its own operating system 98 installed within the control unit 92, then the host language, such as C++ can be inputted directly into the control unit 92. Thereupon, the operating system converts the instructions of the host language into machine language for operating the computer 94. In the event that the control unit 92 does not have an operating system installed therein, then the host language must be processed further by the computer system 26 to produce the machine language for instructing the computer 94 in accordance with the encoding and the decoding functions, as set forth in the imperative form of the TSN language outputted by the second processing section 38 of the computer system 26. In the control unit 92, the dynamic memory section 96A stores the present state of the operation of the various units of the telephone 70, while the static memory section 96B stores the encoding and decoding functions for control of the data, and the state machine code.

It is understood from the foregoing description that the TSN language provides for an important part of the practice of the methodology and the system of the invention to enable a facile programming of the control unit 92 in accordance with a protocol of the ASN.1 language and subsequent modifications thereof. It is noted, in the use of systems for which coding can be provided by means of the TSN language, that such a system may include a single digital signal processor (DSP) or it may consist of many DSP modules, codec, baseband unit and RF unit, by way of example. Thus, the TSN language is useful for providing code for systems of various configurations. In particular, the TSN language is related to control of information to be sent over a radio or other form of communication link or interface. In the ensuing description, there is provided an explanation of the construction and the utilization of the TSN language so as to enable its employ in the practice of the invention. This description is provided in the form of three appendices wherein the first appendix deals with the general theory of the coding by use of the TSN language, the second appendix is directed to more specific details in the use of the TSN language for carrying forth the present invention, and the third appendix presents examples in the use of the TSN language for generating the coding and the decoding functions.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

TRANSFER SYNTAX NOTATION

APPENDIX - 1

TECHNICAL SPECIFICATION

1.0 Introduction

1.1 Objective

This document specifies a declarative language for specifying codecs for bit-oriented protocols. The abstract syntax for the signalling messages shall be defined using Abstract Syntax Notation One [2][3].

This document specifies a method to implement encoding and decoding functions for communication protocols.

The description language - which is called Transfer Syntax Notation - is particularly, but not exclusively, applicable for defining lower layer GSM protocols.

1.2 References

[1] Hakulinen, K. Introduction to NRC TTCN tools. Nokia Research Center, 1995.

[2] ISO8824 Information Technology - Open Systems Interconnection - Specification of Abstract Syntax Notation One (ASN.1).

[3] ISO8825 Information Technology - Open Systems Interconnection - Specification of Basic Encoding Rules for Abstract Syntax Notation One (ASN.1).

[4] ISO9646 Information Technology - Open Systems Interconnection - Conformance Testing framework, Parts 1-5.

[5] Jaffar 87 J. Jaffar and J.-L. Lassez. Constraint Logic Programming. In *Proc. Fourteenth Ann. ACM Symp. Principles of Programming Languages*, 111-119, 1987.

1.3 Definitions

The definitions in [2] are used in this specification.

abstract syntax specifies the information intended to be conveyed between signalling entities. In the world of communication protocols, the notion of abstract syntax is strongly connected to Abstract Syntax Notation One (ASN.1), a language for describing structured information.

argument: an argument used in the reference of information element or PDU built-in function: a function offered by TSN language.

external standard: specifies a set of valid PDU's needed for messaging between two signalling entities.

formal argument: an argument specified in the argument declarations.

information element *(IE)*: a modular component of the

Appendix - 1 internal standard: specifies an API for signalling with the peer entity.

message: same as protocol data unit.

operational semantics: a set of valid computations (of the program).

Protocol Data Unit *(PDU)*: a message to be conveyed across some communication medium.

signalling entity: an entity capable of messaging in terms of a communication protocol.

transfer syntax specifies the external behaviour for the signalling entity. The standard specifies the valid PDU's to be conveyed between signalling entities.

user (of TSN): The individual or organization that defines the transfer syntax using TSN.

1.4 Abbreviations

| | |
|---|---|
| API | Application Programming Interface |
| ASN.1 | Abstract Syntax Notation One |
| BER | Basic Encoding Rules for ASN.1 |
| ETS | Executable Test Suite |
| IE | Information element |
| IUT | Implementation Under Test |
| ITSN | Imperative Transfer Syntax Notation |
| PDU | Protocol Data Unit |
| TSN | Transfer Syntax Notation |

1.5 The structure of this document

Chapter 2 introduces basic concepts used behind the specification of the TSN language.

Chapter 3 gives an informal overview of basic methodology and primitives of the TSN language. Coding of the various types will be demonstrated.

Chapter 4 specifies the most primitive building blocks of TSN programs: characters and items.

Chapter 5 specifies the grammatical rules generating all syntactically valid TSN programs.

Chapter 6 specifies the predefined types and functions offered by the TSN language.

Appendix - 1

Chapter 7 gives a snapshot of the future development concepts.

1.6 Conventions used in this document

The TSN notation consists of a sequence of characters from the TSN character set specified in section 4.1 on page 17.

Each use of TSN contains characters from the TSN character set grouped into TSN items. TSN items are defined in section 4.2 on page 17.

The TSN language is specified in section 5.0 on page 19 by specifying the collection sequences of items which form valid instances of the TSN.

The TSN language and its semantics will be introduced in chapter 3 quite informally.

Many concepts will be introduced in the light of a simple example. Information element and PDU examples consists of title line and both graphical and textual description. If any user defined ASN.1 types are being used, they will be presented too.

2.0 Background

This chapter introduces the basic concepts used behind the specification of the TSN language.

2.1 Abstract and transfer syntax

The difference between data and information can be described as follows: the data is something that results when the information have been interpreted in some context. The "information" has a connotation of meaningfulness whereas "data" has not.

In the communication protocol context, the purpose of sending messages (data) is to convey meanings across some communication medium. Both signalling entities should 'know' what information is included in the message. One solution for the problem is to specify not only the transfer syntax but also the abstract syntax of the message. Transfer syntax defines the valid messages to be conveyed between signalling entities. Abstract syntax defines "meanings" for those messages.

Abstract syntax notation one [2] is a language for desribing abstract syntax. When using ASN.1 language, the user need not to be concerned with how this information is represented while in transit. That is because of basic encoding rules (BER) can be used [3].

In case bit-oriented protocols, where protocol specifications start up with transfer syntax, the basic encoding rules (or any other encoding rules) can not be easily used. However, it could be useful to have an abstract syntax. ASN.1 can also be used to describe the abstract syntaxes for the bit-oriented protocols as we can see in the following chapters.

Appendix - 1

FIGURE 1. Abstract and transfer syntax

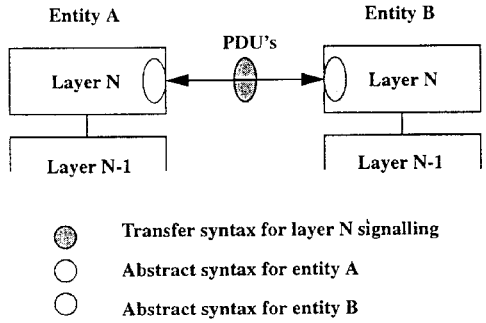

- ⬤ Transfer syntax for layer N signalling
- ◯ Abstract syntax for entity A
- ◯ Abstract syntax for entity B

2.2 TTCN testing

TTCN [4] is a standardised, high-level language for describing abstract test suites for communication protocols. The TTCN test suites are abstract in the sense that they are not executable without any domain-specific software.

In TTCN, the abstract syntax for the messages is being given in ASN.1 or TTCN tabular format. The abstract syntax specifies the messages to be conveyed between tester and implementation under test (IUT). When implementing the executable test suite (ETS), the encoding/decoding functions between abstract and transfer syntax have to be implemented.

In NRC, development of executable test suites is being done with the help of various tools, editors and code generators [1].

3.0 Transfer Syntax Notation

This chapter introduces the basic primitives of the TSN language. The presentation is quite informal, trying to enlight the basic constructs offered by the TSN language.

3.1 TSN specification framework

The notion of peer-to-peer messaging can be categorized in terms of three orthogonal concepts:

- view: A/B peer entities
- direction: encoder/decoder
- signals: message set

In TSN, the view to the signalling is defined in terms of transfer syntax. The definition of a single message defines both encoding and decoding functions. That implies that for each message one should only specify wether the message goes in A->B, B->A or both directions. So, assuming that the same internal standard is being used in both sides, the TSN definitions may be used to describe the codec functions for both signalling entities.

Appendix - 1

3.2 Abstract and transfer syntax in TSN

In TSN, the data types for abstract syntax are being defined by using ASN.1. Definitions form an API for the application programmer and they should have a connotation of meaningfulness for the programmer. Encoding rules specify on how this information can be concretized into sequence of bytes. TSN offers some primitive mechanisms for defining such mapping between abstract and transfer syntax.

The definition of abstract and transfer syntax is a parallel process. Nonetheless, in case of bit-oriented protocols, the design process starts up with transfer syntax. Gradually, by using appropriate means, designer tries to define the best possible abstract syntax for human users to read. That is the basic coreography in TSN too. On the other hand, when looking at the implementors side, the programmer defines the codec functions for the abstract types. So, when defining codecs for not only the simple types but also the structured types too, the TSN program should have a reference to an ASN.1 module.

FIGURE 2. Designing abstract and transfer syntax

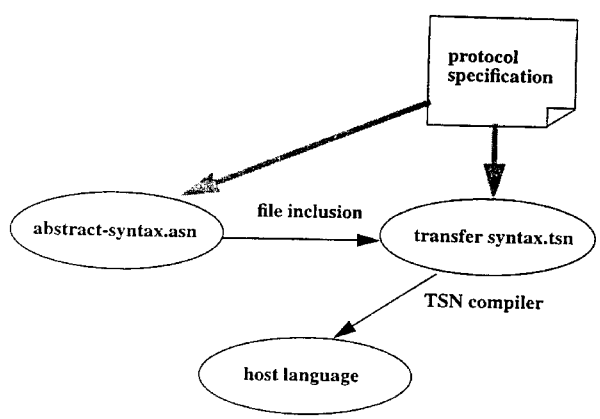

3.3 TSN paradigm

3.3.1 Motivation

TSN is designed for defining transfer syntax for the abstract syntax given in ASN.1. In favourable circumstances, the coding can be specified completely by using TSN, and only an appropriate backend compiler is needed to produce entire codec software. By using various back-end compilers one may produce codec functions to different platforms. And all this can be made from the same protocol description.

TSN allows user to define information elements and PDU's of a protocol. PDU's may contain information elements and vice versa. The description technique is uniform in both component types.

Usually, protocol specifications define the valid messages by illustrating bitmaps, diagrams, information element lists and things like that. A very typical feature in those descriptions is that they all define both encoding and decoding in one description. The main motivation behind TSN, is to formalize this specification technique, and to formulate a declarative, two-way tool for describing codec modules. Comparing to the procedural paradigm, in which one has to define both encoding and decoding functions in order to get proper functionality, this kind of declarative paradigm is more expressive enabling codec functions being described in single expressions. Furthermore, that facilitates the development of more intuitive and human-oriented graphical interfaces.

3.3.2 Interface definition

Protocol element definitions consist of interface definition and body. Interface definition specifies the name of the element and list of arguments, with accurate mode information. Example 1 illustrates an information element definition taken from the ISDN user part (ISUP) protocol. The cause_indicators information element has two arguments. First one, c, is of type CauseIndicators. When encoding, c goes in and when decoding, c goes out. Keyword IN in the second argument definition determines that the boolean argument tagP goes *in* in both directions, encoding and decoding. In ISDN user part protocol, there are information elements, which are being used in two kinds of situations: the format identifier of the element may or may not be present, depending on the optionality of the information element in the particular message. So, when using a boolean argument for determining the presence of the format identifer, the same information element definition may be used in both situations.

EXAMPLE 1. ISDN User Part 'Cause indicators' information element

Interface:    cause_indicators(c : CauseIndicators, IN tagP: BOOLEAN)

```
1   -- ASN.1 definitions for the CauseIndicators type
2   CauseIndicators ::= SEQUENCE {
3       codingStd       CodingStd,
4       location        Location,
5       causeValue      ISUPcause OPTIONAL,
6       diags           OCTET STRING OPTIONAL
7   }
8
9   CodingStd ::= ENUMERATED {
10      ccitt              (0),    -- CCITT standardized coding
11      otherInternational (1),    -- ISO/IEC standard
12      national           (2),    -- national standard
13      locationSpec       (3)     -- specific to identified location
14  }
15
16  Location ::= ENUMERATED {
17      u    (0),       -- user
18      lpn  (1),       -- private network service the local user
19      ln   (2),       -- public network serving the local user
20      tn   (3),       -- transit network
21      rln  (4),       -- public network serving the remote user
22      rpn  (5),       -- private network serving the remote user
23      intl (7),       -- international network
24      bi   (10)       -- network beyond interworking point
25  }
26
27  ISUPcause ::= ENUMERATED {
28      unallocatedNumber              (1),
29      noRouteToSpecifiedTransitNetwork (2),
30      noRouteToDestination           (3)
31      -- and lots of others, for complete description, see [TS Q.763]
```

Appendix - 1

32 )

3.3.3 Visual primitives

The examples presented in this documentation include also graphical illustration. The following visual primitives will be used.

FIGURE 3. Visual primitives

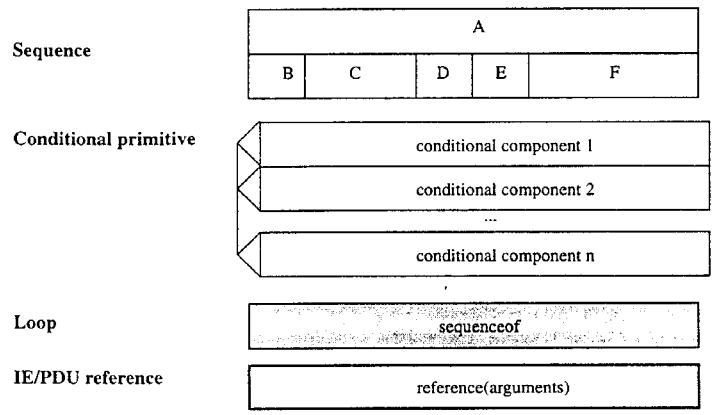

By using visual primitives, the transfer syntax for the CauseIndicators may be described as in example 2. The first octet is format identifier of the element (value: 18), and its presence may be adjusted in the with the tagP argument. Thus, a condition within the first conditional triangle is tagP.

EXAMPLE 2. A pedagogical simplification of the ISDN User Part 'Cause indicators' information element Interface:   cause_indicators(c : CauseIndicators, IN tagP: BOOLEAN)

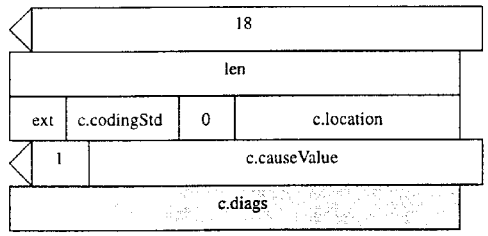

The primitive constructs will be listed in table 1. The more technical descriptions can be found in TSN 5.10.1-5.10.8.

TABLE 1. TSN primitives

| | | |
|---|---|---|
| • bitfield | single bitfield | TSN 5.10.1 |
| • sequence connector ',' | append bitfield sequences | TSN 5.10.2 |

Appendix - 1

| | | |
|---|---|---|
| • mark | catch position within the frame | TSN 5.10.3 |
| • layout | change bitfield ordering | TSN 5.10.4 |
| • filler | fill bitfield with 0's or 1's | TSN 5.10.5 |
| • conditional primitive | conditional structures | TSN 5.10.6 |
| • loop | sequential structures | TSN 5.10.7 |
| • coding separator | encoding differs from decoding | TSN 5.10.8 |

3.3.4 Constraints

Let us recall our previous codec definition (example 2). Our codec definition contains many undefined elements, `len` and `ext` for instance. TSN allows user to declare local variables and to define simple relations between variables. Here, extension bit `ext` is 1 if and only if `c.causeValue` is present. Also, `len` counts the length of the rest of the element, which depends on the value of `ext` and the length of the `c.diags`. In TSN, this kind of relations can be expressed in terms of constraints. The constraints may comprise variable declarations, linear equations and other equations.

EXAMPLE 3. ISDN User Part 'Cause indicators' information element

Interface:    cause_indicators(c : CauseIndicators, IN tagP: BOOLEAN)
    Constraints:
- len, ext, diagslen: INTEGER
- len = diagslen + 2 - ext
- diagslen = length(c.diags)
- ext = if present(c, "causeValue") then 0 else 1

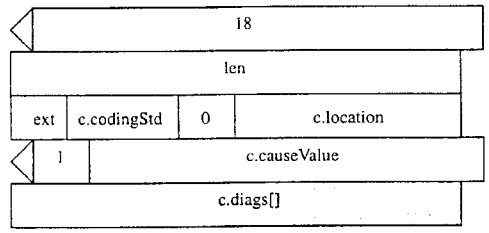

```
1    -- TSN definition defining coding for the CauseIndicator type
2    IEDEF
3    -- when encoding, C and tagP come in and when decoding,
4    -- only C comes out
5    cause_indicators (c : CauseIndicators, IN tagP: BOOLEAN)
6         -- constraints
7         ( len, ext, diagslen: INTEGER,
8           diagslen = length(C.diags),
9           len = diagslen + 2 - ext,
10          ext = if present(c, "causeValue") then 0 else 1)
11
12        -- coding
13   IF tagP THEN                                    -- tag present ?
14        bitstring(8, 18,          stdC)
15   END IF.
16   bitfield(8, len,               stdC),           -- len
17   bitfield(1, ext,               stdC),           -- extension bit
18   bitfield(2, c.codingStandard,  stdC),           -- coding standard field
```

```
19      bitfield(0, 1,                    stdC),        -- spare
20      bitfield(4, c.location,           stdC),        -- location field
21      IF ext = 0 THEN
22          bitstring(1, 1,               stdC),
23          bitstring(7, c.causeValue,    stdC)         -- cause value field
24      END IF,
25      LOOP(c.diags, i, i < diagslen, octet, i)        -- diagnostics field
26          bitfield(octet, 8,            stdC)
27      END LOOP
28 END IEDEF
```

The notion of constraints in TSN have slight connections to the field of constraint programming [5].

3.4 Defining PDU's

The coding for the ASN.1 type T can be defined by specifying name, formal arguments (containing an argument of type T) and the body of the PDU. The possible messaging directions may be annotated too. The preassumption is that PDU goes in both directions.

PDUDEF [identifer ( '->' | '<-' | '<->' ) identifier]
        identifier '(' <formal argumentargument declarations> ')'
        <body>
    END IEDEF The formal argument declarations should be annotated with accurate mode information when differing from the default: when encoding then IN, otherwise OUT. A special operator called coding separator may be used accordingly. Let us consider an argument declaration `[OUT|IN] argument: INTEGER`. This means that the encoder will set the (originally free) `argument`. On the other hand, when decoding, the `argument` should be ground.

<formal argument declarations> ::=
    <argument declaration> (',' <argument declaration>)*

<argument declaration> ::=
    [IN | OUT | '[' IN '|' OUT ']'] identifier ':' <type reference>

EXAMPLE 4. ISDN User Part Q.763/TABLE 40: Circuit group blocking message

Interface:    circuitGroupBlocking(value : CircuitGroupBlocking)

| |
|---|
| 24 |
| circuitGroupSupervisionMessageTypeIndicator(value.cgsmti) |
| rangeAndStatus(value.rs) |

```
29 CircuitGroupBlocking ::= SEQUENCE {
30      cgsmti CircuitGroupSupervisionMessageTypeIndicator,
31      rs RangeAndStatus
32 }
33
34 -- TSN definitions
```

Appendix - I

```
35  PDUDEF circuitGroupBlocking(value : CircuitGroupBlocking)
36      bitfield(24, 8, stdC),                                        -- format id
37      circuitGroupSupervisionMessageTypeIndicator(value.cgsmti),-- information
38      rangeAndStatus(value.rs)                                      -- elements
39  END PDUDEF
```

PDU definitions may contain references to (other) PDU definitions and information element definitions. In example 4 the circuitGroupBlocking PDU consists of three components: a tag (of value 24) and information elements `circuitGroupSupervisionMessageTypeIndicator` and `rangeAndStatus`.

3.5 Defining information elements

Defining encoders/decoders for information elements is in principle the same as defining the PDU's.

IEDEF [identifer ( '->' | '<-' | '<->' ) identifier]
    identifier '(' formal argument declarations ')'
    body
END PDUDEF Resembling to the PDU definitions, the information element definitions may contain references to (other) information element definitions and PDU definitions. So, TSN offers mechanism for constructing codecs from codecs of the more basic types.

3.6 How to code scalar types

The coding for scalar types, integers and enumerated types for example, can be defined by using the bitfield primitive:

bitfield(*value, length, coding scheme*)

*value* is the value to be en/decoded, *length* is its length in bits and *coding scheme* is an operator defining an encoding mechanism for the bitfield. A *stdC* is the most common built-in coding function describing the usual most-significant-bit-in-left coding for positive numbers (i.e. $stdC(5) = 101_2$). A set of bitfields can be composed to sequences of bitfields by using a ','-connector. The encoding proceeds from left to right within and between bytes. However, in some cases, it could be useful to chance the bitfield ordering. The layout primitive may be used to change the composition of the bitfield sequences.

layout(*string*)

The argument is interpreted as follows:

TABLE 2. Arguments for the layout primitive.

| | |
|---|---|
| ">>" | between and wthin bytes: from left to right. Default. |
| "><" | within bytes: from right to left |
| "<>" | reserved |
| "<<" | reserved |

Appendix - 1

The composition ">>" is default. Example 5 illustrates some encodings of the bitfield sequences.

EXAMPLE 5. Some bitfield encodings. NOTE - '|' separates bytes.

$bitfield(3, 4, stdC) = 0011$ $bitfield(257, 12, stdC) = 00000001|0001$ $bitfield(3, 4, stdC), bitfield(257, 12, stdC) = 00010011|00010000$ $layout\ (><), bitfield(3, 4, stdC), bitfield(257, 12, stdC) = 00110001|00010000$

3.7 The notion of constraints

Quite often in the bit-oriented protocols one face a need to establish some kind of mapping between the information and its coding. Let's pick up the BCD coding for instance: each number is presented in half octet (0-15). Let's say that we need to convert the coded numbers to elements of a string (ASCII-values). In the TSN system, the sequences may be equipped with constraint sets:

$\{Y \in INTEGER, Y = X + 48\}\ bitfield\ (X, 4, stdC)$ .

Here, the relation $Y = X + 48$ describes the fact that when we are decoding, the value of $Y$ will be the decoding of $X$ plus ordinal value of ASCII-'0' (48). But when encoding, the meaning is opposite (but logical): the encoding of $Y$ is an encoding of $bitstring\ (X - 48, 4)$ !

EXAMPLE 6. Encoding and decoding semantics for constraints

```
1    -- TSN definition
2    IEDEF a_codec(y: INTEGER)
3        {y : INTEGER, y = x + 48}
4        bitfield(x, 4, stdC)
5    END IEDEF
6
7    -- an encoder compiled from a_codec definition is (pseudocode):
8    -- a_codec_encoder(frame: Frame, y:INTEGER)
9    --     x := y - 48;
10   --     bitfield_encode(Frame, x, 4, stdC);
11   -- END a_codec_encoder
12
13   -- a decoder function compiled from a_codec definition
14   -- a_codec_decoder(fr: Frame, OUT y:INTEGER)
15   --     bitfield_decode(Frame, x, 4, stdC);
16   --     y := x + 42;
17   -- END a_codec_decoder
```

The constraint set may contain variable declarations, linear equations and other equations. The compiler is able to analyze linear equations in order to generate accurate substitutions to both encoder and decoder. If a relation contains "nonlinear" functions, conditional expressions or other built-in functions for example, the compiler generates the substitution instructions whenever possible. Unfortunately, in that case, the mapping should be described explicitly in both directions. When using explicit mapping, the use of coding separator (' [ | ] ') is recommended. See example 7.

EXAMPLE 7. Explicit mapping: Calling party BCD number

```
1    -- GSM 04.08/10.5.4.9 Calling party BCD number
```

```
 2
 3   IEDEF bcdNumber(c:Octet)
 4       -- bcd coding as defined in TABLE 10.81/GSM 04.08
 5       {x : Octet,
 6        [x = if (c = 42) then 10           -- '*' -> 10
 7              else if (c = 35) then 11     -- '#' -> 11
 8              else if (c = 97) then 12     -- 'a' -> 12
 9              else if (c = 98) then 13     -- 'b' -> 13
10              else if (c = 99) then 14     -- 'c' -> 14
11              else c + 48 |
12        c = if (x = 10) then 42            -- 10 -> '*'
13              else if (x = 11) then 35     -- 11 -> '#'
14              else if (x = 12) then 97     -- 12 -> 'a'
15              else if (x = 13) then 98     -- 13 -> 'b'
16              else if (x = 14) then 99     -- 14 -> 'c'
17              else x - 48]}
18       bitfield(x, 4, stdC)
19   END IEDEF
```

As far as being a declarative language, TSN does not allow destructive substitutions to the variables. Only the relations between variables can be expressed. Thus, the following constraint sets are illegal and can not be compiled at all (!):

$\{x : integer, x = 1, x = 2\}$ $\{x, y : integer, x = 1, y = 3 + x, x = y + 1\}$ A variable is said to be *free*, if it is not bound to anything. The variable is said to be *ground*, if it does not contain any free components (like ASN.1 value). Some built-in functions have been defined. Complete specifications will be given at section 6.2 on page 26.

- present
- absent
- if-then-else / ?-: (conditional expression)
- length
- not
- and
- or
- odd
- even
- div
- mod
- ord
- peek
- append
- + (setof union)
- - (setof difference)
- / (setof intersection)

- : (setof member)
- :: (setof partof)
- =, !=, <, >, =<, >= (relational operators)

NOTE - Constraint sets are local, allowing only the constraints, wich have only local effects. However, in some cases, it could be useful to extend the this restriction of local relations. One example is a program specialization, allowing the user to specialize the existing definitions into more specific use. In that sense, the idea resembles loosely to the use of ASN.1 constraints. The topic is for further study.

3.8 How to code a sequence type

The coding for the sequence type should be done completely within a single module. Every component should be specified excplicitly, even if they are optional or the default values have been introduced.

EXAMPLE 8. GSM 04.08/10.5.1.5 Classmark 1 (sequence type)

Interface: classmark_1(x : Classmark_1)

| 0 (tag) | | | | |
|---|---|---|---|---|
| 0 | x.revision | 0 | x.a5_1 | x.power_class |

```
1   Classmark_1 ::= SEQUENCE {
2       revision ENUMERATED {phase1(0), phase2(1)},
3       a5_1 ENUMERATED {available(0), not_available(1)},
4       power_class  RF_power_capability
5   }
6   RF_power_capability ::= ENUMERATED {
7       pwr_cl1(0),
8       pwr_cl2(1),
9       pwr_cl3(2),
10      pwr_cl4(3),
11      pwr_cl5(4)
12  }
13
14  -- TSN definition
15  IEDEF classmark_1(x : Classmark_1)
16      bitfield(0, 8, stdC),          -- tag
17      bitfield(0, 1, stdC),          -- spare bit
18      bitfield(x.revision, 2, stdC),
19      bitfield(0, 1, stdC),          -- spare bit
20      bitfield(x.a5_1, 1, stdC),
21      bitfield(x.power_class, 3, stdC)
22  END IEDEF
```

The special symbol OMIT should be used to indicate the absence of an optional element. Also, the default values should be substituted explicitly. Example 9 illustrates those kinds of situations. Abstract type consists of two components: componentA with a default value 0 and an optional component componentB. componentA is present only if its value differs from the default. Extension bit is being used to implement the logic (lines 9 and 13-18). The extension bit is also used for defining the coding for componentB (lines 10 and 19-23).

Appendix - 1

EXAMPLE 9. Optional and default-valued components

Interface: a_type_codec(x : A_type)
Constraints:
- ext0, ext1: INTEGER
- ext0 = if (x.componentA = 0) then 1 else 0
- ext1 = if (present(x, componentB)) then 0 else 1

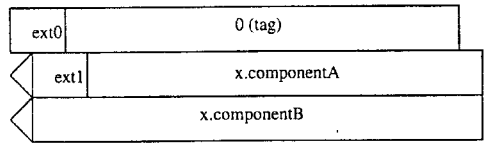

```
1   A_type ::= SEQUENCE (
2       componentA INTEGER DEFAULT 0,
3       componentB INTEGER OPTIONAL
4   )
5
6   -- TSN definition
7   IEDEF a_type_codec(x : A_type)
8       (ext0, ext1: INTEGER,
9        ext0 = if (x.componentA = 0) then 1 else 0,
10       ext1 = if (present(x, componentB)) then 0 else 1)
11      bitfield(ext0, 1, stdC),
12      bitfield(0, 7, stdC),
13      IF (ext0) THEN                  -- non-default value
14          bitfield(ext1, 1, stdC),
15          bitfield(x.componentA, 7, stdC)
16      ELSE                            -- default value 0
17          {x.componentA = 0}          -- a block with no primitives
18      END IF,
19      IF (ext1) THEN                  -- componentB: present
20          bitfield(x.componentB, 8, stdC)
21      ELSE                            -- absent
22          {x.componentB = OMIT}
23      END IF
24  END IEDEF
```

3.9 How to code a set type

The coding of set type corresponds to the coding of sequence type.

3.10 How to code a choice type

A choice type is defined in terms of a collection of component types, its distinct alternatives. The choice types are similar to the union types found in some programming languages, pascal and C for example.

The most common way to encode the distinct selection of the choice variable, is the use of format identifiers. When encoding, the current format identifier is being encoded to the message as a bitfield. But when decoding, the right alternative should be selected by peeking a value of the format identifer. In TSN, the format identifiers should be implemented "by hand". The most obvious way to do that, is the nested use of IF:

```
IF [present(variable,alternative1) | peek(offset, length) = tag_value1] THEN
    codec_alternative1(variable.alternative1)
ELSE IF [present(variable,alternative2) | peek(offset, length)=tag_value2] THEN
    codec_alternative2(variable.alternative2)
ELSE IF [present(variable, alternative3) | peek(offset, length) = tag_value3)] THEN
    codec_alternative3(variable.alternative3)
...
ELSE -- alternativeN
    codec_alternativeN(variable.alternativeN)
```

When encoding, the particular thread will be selected according to the presence of an alternative. But when decoding, the alternative is selected by checking out the tag value. Note that the tags are being defined in the codec definitions $codec\_alternative_i$, $i = 1, ..., N$. A special operator coding separator is interpreted as follows:

$$[f_{enc} \mid f_{dec}]$$

When encoding, the value of the expression will be the value of $f_{enc}$ and when decoding, the value will be the value of $f_{dec}$. In addition to the expressions, the coding separator may also be used in the codec definitions and constraints too.

The built-in function peek can be used for peeking values from the bits to come:

peek (*offset*, *length*)

This function peeks a value of the bitfield of length *length*. The *offset* parameter is the number of bits between the current point and the starting point of the peeked bitfield.

EXAMPLE 10. Choice type

Interface:   choice_example(x : ChoiceType)

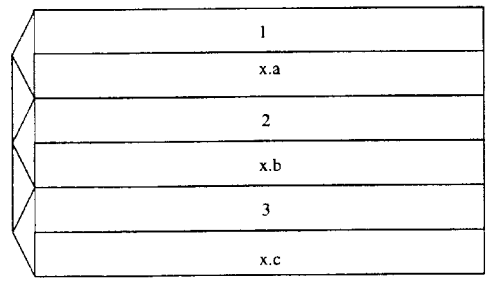

```
1    -- ASN.1 type definition
2    ChoiceType ::= CHOICE {
3        a INTEGER,
4        b INTEGER,
5        c BIT STRING
6    }
7
8    -- TSN codec definition
9    IEDEF choice_example(x : ChoiceType)
```

Appendix - 1

```
10      IF [present(x, "a") | peek(0, 8) = 1] THEN
11          bitfield(1, 8, stdC),
12          bitfield(x.a, 8, stdC)
13      ELSE IF [present(x, "b") | peek(0, 8) = 2] THEN
14          bitfield(2, 8, std),
15          bitfield(x.b, 8, stdC)
16      ELSE
17          bitfield(3, 8, stdC),
18          bitfield(x.c, 8, bitstringC)
19      END IF
20      END IF
21 END IEDEF
```

3.11 How to code a sequence-of type

A sequence-of type is defined in terms of a single component type, and its values are the ordered collections of the values of the component type. The coding for the sequence-of type can be described by using a specific primitive:

LOOP (*variable*, *index-name*, *condition*, *component*, *index-value*)
   <*body*>
END LOOP The operational semantics can be described as follows. *Index-name* will be given the values 0, 1, 2, ... until the *condition* is evaluated FALSE. For every index value, <*body*> will be evaluated, and in <*body*>, symbol *component* denotes the component *variable*[*index-value*]. In the loop body, it is possible to declare constraints for the component as usual. The (other) components may not be referenced. So, in the loop body, only the coding of a single component can be defined.

Example 11 illustrates a coding of the bitstring. The reason for the use of the loop-primitive is that bits are counted down from the last bit to the first bit. So, the coding scheme bitstringC can not be used. The size will be given in the arguments and loop runs index i from 0 to size-1. For every i, the component bstr[size-1-i] will be encoded/decoded.

EXAMPLE 11. Part of GSM 04.08/10.5.2.1b Cell channel description (sequence-of type)

Interface:     bitstring(x : BoolSeq, IN size : INTEGER)

x[size-1-i]

```
1   -- TSN codec definition
2   IEDEF backward_bitstring(bstr : BIT STRING, IN size : INTEGER)
3       LOOP (bstr, i, i < size, a_bit, size-1-i)
4           bitfield(a_bit, 1, stdC)
5       END LOOP
6   END IEDEF
```

3.12 How to code a setof type

The setof type resemble the sequence-of type, the only difference being that the order of the component values is not significant at the semantical level. However, the indexing and usage of the type corresponds to the sequence-of type.

Appendix - 1

3.13 How to code string types

The coding of string types corresponds to the coding of sequence-of type. The type of a single component of bitstring is Boolean. Character and octet string types are interpreted as sequences of *Octets*:

```
Octet ::= INTEGER (0..255)
```

Several coding schemes can be used when defining codecs for the string types:

- bitstringC
- octetstringC

4.0 Characters and Items

This chapter defines the most primitive building blocks of the TSN programs, characters and items.

4.1 TSN characters

4.1.1 TSN character set

A TSN item shall consis of a sequence of the characters listed in table 3.

TABLE 3. TSN characters.

```
A to Z
a to z
0 to 9
> < { } [ ] ! ( ) , . : ; ! ? = + - * / ' "
```

The upper and lower case letters shall be regarded as distinct.

4.1.2 Additional characters

Where the notation is used to specify the value of a character string type, all characters of the defined character set can appear in the TSN item, surrounded by the characters ".

Additional characters may appear in the single line note.

4.2 TSN items

TSN item shall consist of a sequence of TSN characters. The sequence should be conformant with the rules 4.2.1-4.2.9.

4.2.1 Item

```
item            ::=             identifier |
                                typeReference |
                                keyword |
```

```
                    number |
                    bstring |
                    hstring |
                    cstring |
                    nonAlphabeticItems |
                    asn1items |
                    comment
```

4.2.2 Identifier

An identifier shall consist of one or more letters and digits. The initial character shall be a lower-case letter.

4.2.3 Type reference

A type reference shall consist of one or more letters and digits. The initial character shall be an upper-case letter.

In TSN, there is no way to define new (more complex) types. New types can be defined in the ASN.1 modules only.

NOTE - opposite to the ASN.1 type reference, the hyphens can not be used in the TSN type references.

4.2.4 Keywords

The following keywords are added to those of ASN.1 keywords:

| CONSTDEF | DOCUMENT | ELSE    | END   |
| -------- | -------- | ------- | ----- |
| ENTITYDEF| EXPORT   | FUNDEF  | IEDEF |
| IF       | IMPORT   | IN      | LOOP  |
| OMIT     | OUT      | PDUDEF  | THEN  |
| USER     | and      | div     | else  |
| if       | layout   | mark    | mod   |
| not      | or       | then    |       |

4.2.5 Number

Number item shall be defined as in ASN.1 [2].

4.2.6 String items

Binary string item, hexadecimal string item and character item shall be defined as in ASN.1 [2].

4.2.7 Non-alphabetic items

Non-alphabetic items shall be listed in table 4.

TABLE 4. Non-alpabetic items

Appendix - I

```
     ->           <->            <-           {
     }            [              ]            |
     (            )              >            <
     ,            .              ;            ..
     -            =<             >=           =
     !=           ?              +            *
     /            :              :            ::
```

The upper and lower case letters shall be regarded as distinct.

4.2.8 ASN.1 items

The ASN.1 item shall be any of the items defined in ASN.1 specification [2].

4.2.9 Comment

A comment shall consist of a pair of adjacent hyphens and shall end with the next pair of adjacent hyphens or at the end of the line. A comment shall not contain any pair of adjacent hyphens (for ambiguity reasons).

A comment is not referenced in the grammatical rules. However, it may appear at any time between other TSN items. Comment has no significance.

5.0 Grammatical Rules

This chapter specifies the grammatical rules generating the set of syntactically valid TSN programs. The rules will be commented briefly.

5.1 TSN program

The TSN program consists of three parts: document part, user part and definitions part. In the first part, the user may express documentation, references to the specifications, revisioning information and so on. The final interpretation of the data is left to the designer of the visual editor.

```
1   tsnProgram --> documentPart userPart definitionsPart
2   documentPart --> 'DOCUMENT' values 'END' 'DOCUMENT'
3   values -->
4   values --> value values
```

The second part is intended for specifying the functions, information elements and PDU's that are defined elsewhere. Currently, the user-defined functions, information elements and PDU's can not be determined. The production rules userPart, userFunctions, userIEs and userPDUs shall be completed during implementation phase.

```
5   userPart --> userFunctions userIEs userPDUs
6   userFunctions -->
7   userIEs -->
8   userPDUs -->
```

Appendix - 1

The definitions part specifies the references to the abstract syntax definitions file, defines signalling entities, constants, functions, information elements and PDU's.

```
 9 definitionsPart -->
       abstractSyntaxReference
       entityDefinitions
       constantDefinitions
       functionDefinitions
       ieDefinitions
       pduDefinitions
```

5.2 External and general definitions

The ASN.1 modules shall be imported by using IMPORT.

```
10 abstractSyntaxReference --> 'IMPORT' value abstractSyntaxReference
11 abstractSyntaxReference -->
```

The signalling entities shall be defined by using ENTITYDEF.

```
12 entityDefinitions --> 'ENTITYDEF' entityList 'END' 'ENTITYDEF'
13 entityDefinitions -->
14 entityList --> identifier restEntityList
15 restEntityList --> ',' entityList
16 restEntityList -->
```

Constants shall be defined by specifying name (identifier), type and value.

```
17 constantDefinitions -->
       'CONSTDEF' identifier type value
       'END' 'CONSTDEF'
       constantDefinitions
18 constantDefinitions -->
```

Functions shall be defined by specifying its name (identifier), arguments, return type and return value.

```
19 functionDefinitions -->
       funHead expression 'END' 'FUNDEF'
       functionDefinitions
20 functionDefinitions -->
21 funHead --> 'FUNHEAD' identifier argumentDeclarations ':' type
```

5.3 Information element and PDU definitions

Information element definitions and PDU definitions are in principle the same. The definition consist of head and body.

```
22 ieDefinitions --> ieDefinition ieDefinitions
23 ieDefinitions -->
24 ieDefinition --> ieHead body 'END' 'IEDEF'
25 pduDefinitions --> pduDefinition pduDefinitions
26 pduDefinitions -->
27 pduDefinition --> pduHead body 'END' 'PDUDEF'
```

5.4 Interface definitions

The head of the information element/PDU definitions comprises direction annotations, information element/PDU name and argument declarations.

Appendix - 1

```
28 ieHead --> 'IEDEF' directions identifier argumentDeclarations
29 pduHead --> 'PDUDEF' directions identifier argumentDeclarations
```

Signalling entities in the direction annotations should be declared in the entity declarations. The direction annotations effects to the procedural semantics because it is possible to declare separate codec in both direction. The correct definition is being selected statically (by the TSN compiler) according to the direction annotations.

```
30 directions --> identifier directionOperator identifier
31 directions -->
32 directionOperator --> '<->' | '->' | '<-'
```

The argument declarations determine the argument modes statically. When argument mode differs in encoding and decoding semantics, the coding separator can be used.

```
33 argumentDeclarations --> '(' argumentDeclarations0 ')'
34 argumentDeclarations -->
35 restArgumentDeclarations0 --> ',' argumentDeclarations0
36 restArgumentDeclarations0 -->
37 argumentDeclaration --> argumentDirections identifier ':' type
38 argumentDirections -->
39 argumentDirections --> argumentDirection
40 argumentDirections --> '[' argumentDirection '|' argumentDirection ']'
41 argumentDirection --> 'IN'
42 argumentDirection --> 'OUT'
```

5.5 Body of the defintion

The body of the definition comprises constraint set and block.

```
43 body --> constraintSet block
44 constraintSet -->
45 constraintSet --> '{' '}'
46 constraintSet --> '{' constraints '}'
47 constraints -->
48 constraints --> constraint restConstraints
49 restConstraints -->
50 restConstraints --> ',' constraints
```

5.6 Constraint

Single constraint shall be one of the following: coding separator, variable declaration or equation.

```
51 constraint --> '[' constraints '|' constraints ']'
52 constraint --> variableDefinition
53 constraint --> equation
```

5.7 Variables and types

Variable declaration shall be used for binding identifier for the type defined in ASN.1. The type can be simple ASN.1 type (rule 57) or the type defined in an external ASN.1 module.

```
54 variableDefinition --> identifier ':' type
55 type --> simpleASN1type
56 type --> typeReference
57 simpleASN1type -->
        'INTEGER' |
```

Appendix - 1

```
'REAL' |
'BOOLEAN' |
'BIT' 'STRING' |
'OCTET' 'STRING' |
'NULL' |
'OBJECT' 'IDENTIFIER'
```

NOTE - ASN.1 constraints can not be used in the `simpleASN1type`.

5.8 Equation

In addition to the membership-relations, some forms of equations can be expressed.

The syntax for the equations will be given in 5.8.1. Subsections 5.8.2-5.8.3 will give some operational semantics (and restrictions) for the equations.

5.8.1 Grammatical rules

```
58  equation --> expression '=' expression
59  expression --> term
60  expression --> term binaryOperator term
61  binaryOperator -->
        and|or|'='|'!='|'<'|'>'|'>='|'=<'|'+'|'-'|'*'|'/'|div|mod|:|::
62  term --> '-' term
63  term --> 'not' term
64  term --> '(' expression ')'
65  term --> '[' expression '|' expression ']'
66  term --> value
67  term --> 'if' expression 'then' expression 'else' expression
68  term --> expression '?' expression ':' expression
69  term --> identifier '(' parameters ')'
70  term --> variableReference
71  variableReference --> identifier '.' variableReference
72  variableReference --> identifier '[' expression ']' '.' variableReference
73  variableReference --> identifier '[' expression ']'
74  variableReference --> identifier
75  parameters --> expression restParameters
76  restParameters -->
77  restParameters --> ',' parameters
```

5.8.2 Integer and real type

The constraint solver is able to solve linear equations $$c_0 = c_1 \cdot x_1 + \ldots + c_n \cdot x_n,$$

where $c_i$, $i = 0, \ldots, n$ are constants (of type INTEGER or REAL) and $x_i$, $i = 1, \ldots, n$ are variables (of type INTEGER or REAL). The equation may comprise some other functions too. Let $f_i$, $i = 1, \ldots, m$ be built-in functions or user-defined functions and let $\bar{x}_i$, $i = 1, \ldots, m$ be parameter sets (ordered sequences of expressions). Now, the solver is able to detect values for variables $x_1, \ldots, x_n$ in $$c_0 = c_1 \cdot x_1 + \ldots + c_n \cdot x_n + c_{n+1} \cdot f_1(\bar{x}_1) + \ldots + c_{n+m} \cdot f_m(\bar{x}_m).$$

The value shall be calculated as follows. If $x_i$ is free and
$x_1, ..., x_{i-1}, x_{i+1}, ..., x_n, \bar{x}_1, ..., \bar{x}_m$ are ground, the substitution $$x_i = (c_1 x_1 + ... + c_{i-1} x_{i-1} + c_{i+1} x_{i+1} + ... + c_{n+1} f_1(\bar{x}_1) + ... + c_{n+m} f_m(\bar{x}_m)) / c_i$$

can be invoked. The same rule shall be used in the case of linear equations too, the only difference being that $c_{n+1} \cdot f_1(\bar{x}_1) + ... + c_{n+m} \cdot f_m(\bar{x}_m) = 0$.

5.8.3 Other types

For other ASN.1 types, it is possible to declare simple equivalence relations of form $$x = y,$$

where $x$ and $y$ are values or variables. Let $x$, for instance, be a free variable. Now, the substitution $x = y$ can be invoked only if $y$ is ground.

Also, built-in functions and user-defined functions can be used:

$$y = f(\bar{x})$$

Here $y$ is a variable and $\bar{x}$ is a parameter set. Now, $y$ shall be calculated only if parameters $\bar{x}$ are ground (and $y$ is free, of course).

5.9 Block

Block is a sequence of primitives.

```
78 block -->
79 block --> primitive restPrimitive
80 restPrimitive -->
81 restPrimitive --> ',' block
```

5.10 Primitives

Primitives offer some basic operations needed for describing transfer syntaxes. There are two kinds of primitives, non-structured and structured.

5.10.1 Bitfield

```
82 primitive -->
        'bitfield' '('
                (variableReference | value) ','
                expression ','
                identifier ')'
```

Bitfield is an atomic building block of the message. When encoding, all the parameters should be ground. When decoding, second and third argument should be ground and the first argument should be free. See table 5.

TABLE 5. Argument modes for bitfield primitive.

Appendix - 1

- [IN | OUT]
- IN
- IN

5.10.2 Sequence connector ','

Primitive definitions shall be appended by using a ','-connector. The primitive has two implicit parameters:

- horizontal direction: bitfield ordering within a byte. Possible values are > (from left to right) and < (from right to left).

- vertical direction: bitfield ordering between bytes. Possible value is > (from up to down). The value < (from down to up) is not currently supported.

The parameters shall be set by using a layout primitive. See 5.10.4.

5.10.3 Marker

```
83 primitive --> 'mark' '(' variableReference ')'
```

Marker has one argument of type *FrameIndex*. The argument will be given the value according to the current encoding/decoding position.

TABLE 6. Argument modes for marker primitive.

- OUT

5.10.4 Layout

```
84 primitive --> 'layout' '(' value ')'
```

The argument of the layout primitive is of type cstring. The possible arguments are being listed in Table 2 on page 10.

TABLE 7. Argument modes for layout primitive.

- IN

5.10.5 Filler bits

```
85 primitive --> 'filler' '(' value ',' value ')'
```

Filler primitive shall be used to describe sequences of spare bits ending at particular bit position. The first argument shall be either 0 or 1, determining wether we are filling with 0's or 1's. The second argument is of type Offset:

```
Offset ::= INTEGER (0 .. 7)
```

The argument modes shall be listed in table 8.

TABLE 8. Argument modes for filler primitive.

- IN
- IN

Appendix - 1

5.10.6 Conditional primitive

```
86 primitive --> 'IF' expression 'THEN' body elsePart 'END' 'IF'
87 elsePart -->
88 elsePart --> 'ELSE' body
```

Conditional primitive is a structured primitive. Its argument (condition) should be ground in both encoding and decoding.

TABLE 9. Argument modes for conditional primitive.

- IN

5.10.7 Loop

Loop is a structured primitive. The index (second argument) and component names (fourth argument) should be fresh variable names. The end condition (third argument) and index value (fifth argument) should be ground in both encoding and decoding. When encoding, the first argument (of type string, setof or sequence-of) should be ground. But when decoding, it should be free.

```
89 primitive -->
        'LOOP' '('
                variableReference ','
                variableReference ','
                expression ','
                variableReference ','
                expression ')'
                body
        'END' 'LOOP'
```

5.10.8 Coding separator

```
90 primitive --> '[' body '|' body ']'
```

5.10.9 Information element/PDU reference

When referring to another information element/PDU reference, the argument types and modes should be conformant with the corresponding information element/PDU definition.

```
91 primitive --> identifier '(' parameters ')'
```

6.0 Predefined Types and Functions

6.1 Predefined types

The following types shall be defined beforehand:

```
1  Octet     ::= INTEGER (0 .. 255)
2  Offset    ::= INTEGER (0 .. 7)
3  FrameIndex ::= SEQUENCE {
        position INTEGER,
        offset Offset
   }
4  Frame     ::= OCTET STRING
```

Appendix - 1

6.2 Built-in functions

The built-in functions shall be listed in table 10. The type "string" denotes any of the types cstring, hstring and bstring. The functions will presented in a form "name : parameter types --> return type".

TABLE 10. Built-in functions

```
present : SEQUENCE, cstring --> BOOLEAN
present : SET, cstring --> BOOLEAN
absent : SEQUENCE, cstring --> BOOLEAN
absent : SET, cstring --> BOOLEAN
if-then-else : BOOLEAN, any, any --> any
?-: : BOOLEAN, any, any --> any
length : SEQUENCE-OF --> INTEGER
length : SETOF --> INTEGER
length : string --> INTEGER
not : BOOLEAN --> BOOLEAN
and : BOOLEAN, BOOLEAN --> BOOLEAN
or : BOOLEAN, BOOLEAN --> BOOLEAN
odd : INTEGER --> BOOLEAN
even : INTEGER --> BOOLEAN
div : INTEGER, INTEGER --> INTEGER
mod : INTEGER, INTEGER --> INTEGER
ord : BOOLEAN --> INTEGER
ord : ENUMERATED --> INTEGER
ord : INTEGER --> INTEGER
peek : INTEGER, INTEGER --> INTEGER
append : SETOF, SETOF --> SETOF
append : SEQUENCE-OF, SEQUENCE-OF --> SEQUENCE-OF
append : OCTET-STRING, OCTET-STRING --> OCTET-STRING
append : BIT-STRING, BIT-STRING --> BIT-STRING 'SETOF' union, difference and intersection
+ : SETOF, SETOF --> SETOF
- : SETOF, SETOF --> SETOF
/ : SETOF, SETOF --> SETOF 'SETOF' 'member' (:) and 'partof' (::)
: : any, SETOF --> BOOLEAN
:: : SETOF, SETOF --> BOOLEAN
```

RelOp : AType, BType --> BOOLEAN, where
$AType \in \{INTEGER, REAL\}$, $BType \in \{INTEGER, REAL\}$ and
$RelOp \in \{=, !=, <, >, =<, >=\}$ .

% 'REAL' & 'INTEGER' arithmetic
+ : INTEGER, INTEGER --> INTEGER
+ : INTEGER, REAL --> REAL
+ : REAL, INTEGER --> REAL
+ : REAL, REAL --> REAL Appendix - 1

+ : INTEGER --> INTEGER
+ : REAL --> REAL
- : INTEGER, INTEGER --> INTEGER'
- : INTEGER, REAL --> REAL
- : REAL, INTEGER --> REAL
- : REAL, REAL --> REAL
- : INTEGER --> INTEGER
- : REAL --> REAL
* : INTEGER, INTEGER --> INTEGER
* : INTEGER, REAL --> REAL
* : REAL, INTEGER --> REAL
* : REAL, REAL --> REAL
/ : INTEGER, INTEGER --> REAL
/ : INTEGER, REAL --> REAL
/ : REAL, INTEGER --> REAL
/ : REAL, REAL --> REAL

6.3 Coding schemes

The coding scheme is a function defining the coding rule of the bitfield.

6.3.1 stdC

The coding scheme "stdC" can be used for mapping the positive integers, enumerated types and booleans to the bitfields. The value is derived by numbering the bits in the octets, starting with the rightmost bit in the uppermost byte, and ending the numbering with the leftmost bit of the last byte. Each bit is assigned to a numerical value $2^N$, where $N$ is its position in the above numbering sequence. The value of the bitfield is obtained by summing the values assigned to each bit.

6.3.2 twosComplementC

Same as two's complement for integers in ASN.1 BER [3].

6.3.3 bitstringC

The coding scheme "bitstringC" can be used for mapping the bitstrings to the bitfields. The value is derived by numbering the bits in the octets, starting with the leftmost bit in the uppermost byte, and ending the numbering with the rightmost bit of the last byte. Each bit in the bitstring is assigned its position in the above numbering sequence.

6.3.4 octetStringC

The coding scheme "octetStringC" can be used for mapping the octet strings to the bitfields. Let len be the length of the bitfield such that len mod 8 = 0. The encoding of the octet string s shall be defined as follows:

```
1   LOOP (s, i, i<(len div 8), byte, i)
2       bitfield(s, 8, stdC)
3   END LOOP
```

Appendix - 1

TRANSFER SYNTAX NOTATION

APPENDIX - 2

TOOLSET SPECIFICATION

1.0 Introduction

1.1 Objective

This document specifies the toolbox based on Transfer Syntax Notation [5].

This document specifies how TSN definitions can be compiled to encoding/decoding functions needed for translation between (bit-oriented) protocol data units (PDU's) and an internal standard described using Abstract Syntax Notation One [1].

1.2 References

[1] ISO8824 Information Technology - Open Systems Interconnection - Specification of Abstract Syntax Notation One (ASN.1).

[2] ISO8825 Information Technology - Open Systems Interconnection - Specification of Basic Encoding Rules for Abstract Syntax Notation One (ASN.1).

[3] Laitinen, P. Patent application: Transfer Syntax Notation (TSN). Nokia Research Center, 1995.

[4] Robert Sedgewick: *Algorithms*. Addison Wesley, London, 1983, p. 57-66. ISBN 0-201-06672-6.

[5] Specification of Transfer Syntax Notation (TSN). Nokia Research Center, 1996.

1.3 Definitions

The definitions in [5] are used in this document.

frame: An instance of a PDU.

operational semantics: A collection of valid computations.

encoding semantics: A collection of valid encoding computations.

decoding semantics: A collection of valid decoding computations.

TSN backend: A backend module for the TSN static analyzer compiling imperative TSN programs into an appropriate host language.

TSN frontend: A frontend module for the TSN static analyzer offering a user interface for the protocol designer.

1.4 Abbreviations

ASN.1    Abstract Syntax Notation One

BEPI    Backend Programmers Interface

| | |
|---|---|
| IE | Information Element |
| ITSN | Imperative TSN |
| PDU | Protocol Data Unit |
| TC | A TTCN Compiler |
| TC-RTS | TC Run-Time System |
| TS | Technical Specification |
| TSN | Transfer Syntax Notation |
| TTCN | Tree and Tabular Combined Notation |

1.5 The structure of this document

The overall description of the system will be given in chapter 2. The views for the different user groups will be addressed too.

The chapter 3 documents the working horse of the static analyzer, a module called static constraint solver.

The chapter 4 reports on how the basic primitives of the TSN will be compiled to the imperative form.

The chapter 5 aids the backend compiler designer in producing an efficient and highly specialized code. So called bit-position analysis will be introduced.

The overall structure of the visual editor will be given in chapter 6.

The chapter 7 reports on some tester view related matters, trying to answer to the questions like how to interpret TSN definitions and how to define test cases for the TSN definitions.

1.6 Conventions used in this document

The conventions defined in [5] are used in this document.

Many descriptions will be illustrated with block diagrams.

Definitions 1-15 define groundness conditions for the values and variables in TSN. Since the abstract domain comprises some other symbols than 'ground' (see exmaple 1). Thus, the definitions are not complete. However, the compilation of the semantically valid definitions proceeds with ground/non-ground variables.

2.0 The TSN Tool Box

2.1 Views to the system

The TSN system can be seen through several pre-defined abstractions. Those abstractions define appropriate views for the different interest groups of the TSN system.

FIGURE 1. Views to the TSN system.

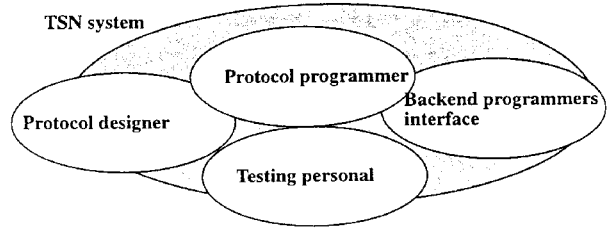

Protocol designer. A view supporting the design and edition of a protocol. The view is offered by the visual editor. The view is a description of the external standard of the protocol.

Protocol programmer. This view offers an API and its specification for the protocol programmer (user). The API specification defines how to send and receive PDU's from the application module (internal standard). The view depends on the backend and there may be several views, one for each backend.

Testing personal. This view offers the interface for the tester of message definition. Typically, the testing will be done by the protocol designers him/herself and the tester interface may be a part of a visual editor (e.g. an interpreter called by a test manager).

Backend programmers interface BEPI. BEPI defines an interface for the backend compiler designer. BEPI supports the designer by specifying an API for the ITSN programs.

2.2 System architecture

The minimal TSN development system consists of static analyzer and an appropriate back-end compiler. Static analyzer converts a declarative protocol specification (TSN expression) into an imperative form (ITSN expression). Back-end compiler is then used to convert ITSN expression into an appropriate host language, C for example. However, a much more sophisticated development system contains an interactive, human oriented visual editor and an interpreter for the development-time debugging. As an immediate and spectacular payoff we get that the generated code need not to be tested anymore.

The system architecture is described in the Figure 2, "System architecture," on page 4.

FIGURE 2. System architecture

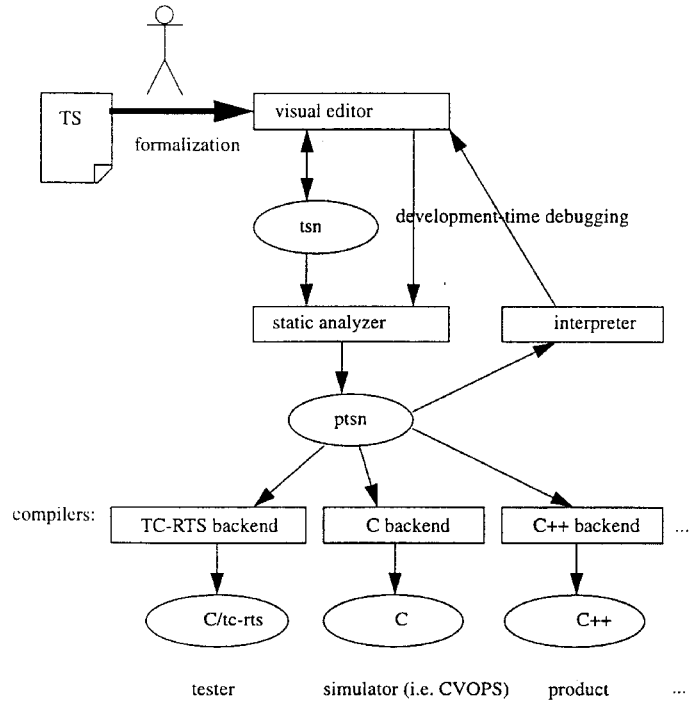

3.0 Static Constraint Solver

The static analyzer converts a declarative TSN expression into an imperative form (ITSN expression). This is done by investigating the operational semantics of the TSN expression with respect to both encoding and decoding semantics. The result of the analysis is a complementary pair of imperative programs: encoder and decoder. The fundamental part of this process is being done by the module called static constraint solver.

FIGURE 3. Projecting declarative TSN program into the pair of imperative programs.

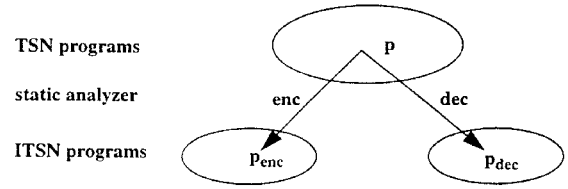

Appendix - 2

The constraint set consists of set of variable definitions and set of equations defining relations between those variables. The types for the variables are in line with those of ASN.1 types [1]. The following subsections will introduce the basic concepts needed for producing imperative encoding/decoding programs from TSN definitions. We start by defining simple conditions which define "readyness" of an ASN.1 variable. Only a ready variable/expression can be used as an argument for the function. Also, only a ready value can be substituted to the variable. This idea of readyness will be encoded to the groundness conditions defined in the following subsections.

3.1 Variable mode approximation

Projection to the imperative program is based on simple approximative reasoning. In compile-time, the concrete values can not be calculated and the approximate values should be used instead.

DEFINITION 1. ASN.1 value expression is ground expression.

DEFINITION 2. A variable bound to the ground expression is ground.

DEFINITION 3. A variable bound to nothing is free.

These simple definitions 1-3 gives the raise to the groundness approximation: every time, a variable mode is free, non-ground or ground. The groundness information can be calculated by replacing the domain of every ASN.1 type with its abstract counterpart $\{ground, non-ground, free, T, \perp\}$. The symbol $T$ (top) denotes the value 'unknown' and $\perp$ (bottom) denotes the value 'erroneous'.

EXAMPLE 1. Modes for the INTEGER variable.

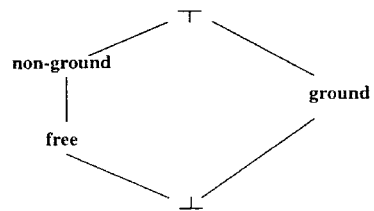

However, to be more precise, the type information should be stored to the abstract domain too. So, an instance of the abstract integer could be i.e. *<integer, ground>*. You may treat the type information as a "tag" of the value.

*To derive an encoder, one need only to suppose arguments of mode IN to be ground and calculate what it means in the abstract world.* Every abstract call of the primitive results in set of constraints: some free or non-ground variables become ground, some variables may become unknown and so on. This new constraint will be merged to the existing one and the compiler proceeds with the next primitive. During merge, when a non-ground variable becomes ground, the substitution command can be generated.

*To derive a decoder, preassumption is an opposite: frame is ground and arguments of mode OUT are free.* In the analysis that causes the parameters of the bitfield primitives to become a ground.

3.2 Scalar types

- Boolean
- Integer
- Enumerated

The groundness information for Boolean, Integer and Enumerated types can be deduced according to the definition 3.

3.3 Real

> DEFINITION 4. The variable of type real is ground if and only if its mantissa, base and exponent are ground.

3.4 String types

- Bitstring
- Octet string
- Character string types

The abstraction of string types is a bit more complicated than in case of scalars.

> DEFINITION 5. The string type is ground if and only if any of its component is bound to the special symbol OMIT.

Compiling the loop-primitive causes the string variable to become ground. The grounding substitution is being done implicitly. Unfortunately, the use of string types (and sequenceof types, in general) includes many restrictions. For more complete description, see [5].

3.5 Sequence

The definition 6 gives the groundness condition for the sequence type:

> DEFINITION 6. The sequence is ground if and only if its elements are ground.

So, every element should be grounded explicitly, even if they are denoted to be optional or the default value has been defined in the type definition.

If a module should ground a sequence parameter (according to the mode declarations), but the static analyzer recognizes some of the optional or default elements to be non-ground, an implicit grounding may be applied. However, a warning message should be reported.

Appendix - 2

3.6 Optional sequence elements

DEFINITION 7. Special symbol OMIT is ground.

The definition 7 implies, that when substituting a special symbol OMIT to the optional sequence element, the element becomes ground.

3.7 Set

The groundness condition for the set type is in principle the same as in case of sequence type:

DEFINITION 8. The set is ground if and only if its members are ground.

So, every member should be grounded explicitly, even if they are denoted to be optional or the default value has been defined in the type definition.

3.8 Choice

Again, the groundness is obvious:

DEFINITION 9. The choice is ground if and only if any of its alternative is ground.

3.9 Selection type

The selection type is not supported.

3.10 Tagged type

Tagging has no impact on the groundness abstraction.

3.11 Any type

DEFINITION 10. A variable of the type ANY is ground if it is bound to the ground value.

3.12 Object identifier type

The groundness condition for the object identifier type is in principle the same as in case of string types. See section 3.4 on page 6.

DEFINITION 11. The object identifier type is ground if and only if some of its component is bound to the special symbol OMIT.

3.13 Sequence-of and setof

The groundness conditions for the sequence-of and setof types are in principle the same as in case of string types. See section 3.4 on page 6.

DEFINITION 12. The sequence-of type is ground if and only if some of its component is bound to the special symbol OMIT.

DEFINITION 13. The setof type is ground if and only if some of its component is bound to the special symbol OMIT.

3.14 Null type

DEFINITION 14. An object of the type null is ground if and only if bound to the NULL value.

3.15 How to store an abstract information

Now we have defined the rules for deducing the groundness information for the ASN.1 variables. Next I list simple definitions and thumb-rules for maintaining accurate type information at compile-time.

- a run-time environment consists of set of variables
- a compile-time environment consists of set of type descriptors plus constraint set over current types
- a type descriptor is stored as a tree
- thus, environment is a collection of trees (descriptor-forest)
- leaf nodes are scalar types and other nodes are categorized wrt the ASN.1 constructor types
- every node contains groundness flag, initially FALSE
- sequence- and set-nodes: node is ground iff its children are ground
- choice-node: it is ground iff any of its children is ground
- strings, setof and sequence-of types in a same way
- an event grounding the node causes every groundness-flag in the descriptor-forest to be updated accordingly
- grounding events may result in substitutions, which should be sorted according to the dependency relation (NOTE - dependency is partial order).

3.16 Built-in functions

To complete this introduction to the static analysis of the TSN constraint sets, the groundness conditions for the built-in functions will be introduced. As defined in [5], the functions are:

- present
- absent
- if-then-else / ?-: (conditional expression)
- length
- not
- and
- or
- odd

- even
- div
- mod
- ord
- peek
- append
- + (setof union)
- - (setof difference)
- / (setof intersection)
- : (setof member)
- :: (setof partof)
- =, !=, <, >, =<, >= (relational operators)

DEFINITION 15. The result of the TSN built-in function is ground if and only if its parameters are ground.

The built-in operators can be easily abstracted by applying the principle described above. As an example, I list an abstraction for the INTEGER addition operator.

EXAMPLE 2. Abstract INTEGER and '+'-operator.
$INTEGER = \{0, -1, 1, -2, 2, ...\}$
$+: INTEGER \times INTEGER \rightarrow INTEGER$
$Abs(INTEGER) = \{ground, non-ground, T, \bot\}$
$Abs(+) : Abs(INTEGER) \times Abs(INTEGER) \rightarrow Abs(INTEGER)$

| + | T | $\bot$ | ground | non-ground | free |
|---|---|---|---|---|---|
| T | T | $\bot$ | T | | T |
| $\bot$ | $\bot$ | $\bot$ | $\bot$ | | $\bot$ |
| ground | T | $\bot$ | ground | | free |
| non-ground | | | | | |
| free | T | $\bot$ | free | | free |

3.17 Normal form for equations

In order that we may simplify the solver design, the equations should be stored in some kind of normal form. In this subsection I present one possible alternative. The description is quite rough and no explicit algorithms will not be given. The linear equations can be maintained in a form $$c_0 = c_1 \cdot x_1 + ... + c_n \cdot x_n,$$

where $c_i, i = 0, ..., n$ are constants and $x_i, i = 1, ..., n$ are variables. The systems of other built-in functions (in the domains of integers and reals) can be maintained in a form:

$$c_0 = c_1 \cdot x_1 + \ldots + c_n \cdot x_n + c_{n+1} \cdot f_1(\bar{x}_1) + \ldots + c_{n+m} \cdot f_m(\bar{x}_m).$$

where $f_i$, $i = 1, \ldots, m$ are built-in functions and $\bar{x}_i$, $i = 1, \ldots, m$ are parameter sets (expressions) in normal form. The values can be solved as described in [5], page 23.

The equations of other domains can be maintained in a form $$x = y$$

or $$y = f(\bar{x}),$$

where $y$ is a variable and $\bar{x}$ is a parameter set.

3.18 Solver architecture

The overall structure of the contraint solver is illustrated in figure 4. The solver has two inputs: the current constraint set (constraint store in fig.) and a new constraint set. The solver merges those two constraint sets and produces a new, consistent set of constraints (updated to the constraint store). The main function of the solver is to generate (imperative) substitutions whenever possible. Those substitutions result in conformant substitutions in the encoding and decoding functions. In case of contradictory constraints the solver stops and reports an error.

FIGURE 4. Solver structure.

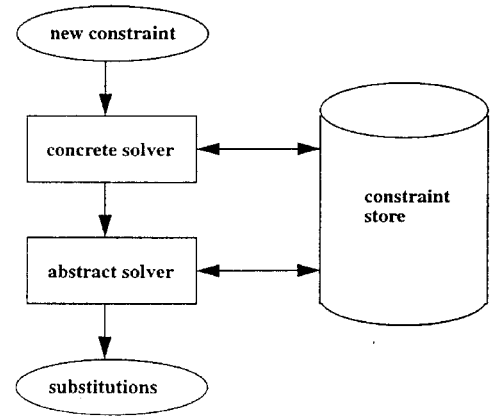

3.19 Concrete solver

The gaussian solver [4] can be used for solving sets of linear equations within constraint sets.

3.20 Abstract conjunctive solver mac

The abstract solver solves equations in abstract domain. The abstract information is stored as guided in section 3.15. The solver investigates the constraint set, a relation by relation, and for every equation, generates a set of possible substitutions of form $$variable = expression$$

and checks wether the *variable* is free and exp*ression* is ground. If true, the substitution can be done.

EXAMPLE 3. Possible substitutions. Assume a constraint set
$Cons = \{a \in INTEGER, b \in INTEGER, \underline{a} = b + 3\}$. Underlined variable $\underline{a}$ is ground. From equation $\underline{a} = b + 3$ one may generate two possible substitution candidates: $\underline{a} = b + 3$ and $b = \underline{a} - 3$. Here, $b$ is non-ground and $\underline{a - 3}$ is ground because of both $\underline{a}$ and 3 are ground. Thus, substitution $b := a - 3$ can be invoked.

A whole algorithm can be described as follows:

```
1   let Cons be the initial constraint set
2   let Subs := {}                        -- an empty list of substitutions
3   PrevSubs := Subs;
4   while PrevSubs <> Subs
5       PrevSubs := Subs;
6       for all equation Eq in Cons do
7           for all (variable = expression) implied by Eq do
8               if variable = non-ground and expression = ground then
9                   -- append a new substitution to the substitution list:
10                  Subs := Subs + {(variable := expression)};
11                  variable := ground       -- abstract substitution in Cons
```

The algorithm is naive, generating all possible substitutions. When implementing an algorithm, the optimization pays.

3.21 Retrospective encoding

In some cases, the whole primitive has to be lifted to the constraint. This exception raises when the primitive contains non-ground arguments, which should be ground. The static analyzer lifts the throw-primitive to the constraint set:

throw(*frame-index, body*)

The constraint solver should be able to recheck the groundness of the desired parameters, and whenever possible, include the throw to the substitution set. For further details of the use of throw, see section 4.9 on page 14.

3.22 Abstract disjunctive solver dmac

When compiling the conditional primitive, some disjunctive constraints should be merged. In other words, one should be able to deduce the groundness information implied by a set of possible histories. That is why the word 'disjunctive' have been introduced. For a more detailed description on the compilation of the conditional primitive, see section 4.8 on page 19.

Again, the abstract information is stored as guided in section 3.15. The solver investigates every groundness indicator, and calculates the abstract disjunctions ('V') between variable mode alternatives:

TABLE 1. Abstract disjunction

| V | $\top$ | $\bot$ | ground | non-ground | free |
|---|---|---|---|---|---|
| $\top$ | $\top$ | $\bot$ | $\top$ | $\top$ | $\top$ |
| $\bot$ | $\bot$ | $\bot$ | $\bot$ | $\bot$ | $\bot$ |
| ground | $\top$ | $\bot$ | ground | $\top$ | $\top$ |
| non-ground | $\top$ | $\bot$ | $\top$ | non-ground | non-ground |
| free | $\top$ | $\bot$ | $\top$ | non-ground | free |

4.0 Static analysis

This chapter defines the static analysis for each TSN primitive. The abstract constraint operations mac and dmac shall be used.

So, the projections *enc* and *dec* (see fig. 3) will be defined. Both enc and dec has two parameters: the definition to be compiled, and the current constraint set. There are also two outputs: encoder/decoder and a new constraint set.

The compilation will be presented in terms of block diagrams. The block diagrams describe the functions enc and dec. If some arrows (usually, two arrows in, two arrows out) in the enc and dec blocks are missing, the input/output is of no significance. The description is based on the compilation rules found in [3].

The definitions are "positive", describing only the output of the legal input. The program code is presented as "pseudo code" presenting only the basic ideas to the reader.

4.1 Information element/PDU definition

4.1.1 Encoding

The compilation shall be illustrated in fig. 5. The module "argument converter" converts mode declarations to the constraint set describing the modes of the formal argument just before entering the definition body. The conversion is being done w.r.t. encoding semantics. The module *enc body* shall be defined in section 4.2.1 on page 14.

FIGURE 5. Compiling the information element/PDU definition into encoding function.

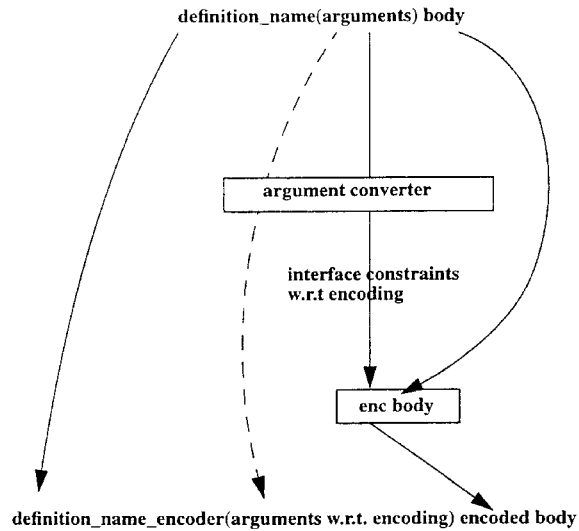

4.1.2 Decoding

The compilation shall be illustrated in fig. 6. The module "argument converter" converts mode declarations to the constraint set describing the modes of the formal argument just before entering the definition body. The conversion is being done w.r.t. decoding semantics. The module *dec body* shall be defined in section 4.2.2 on page 15.

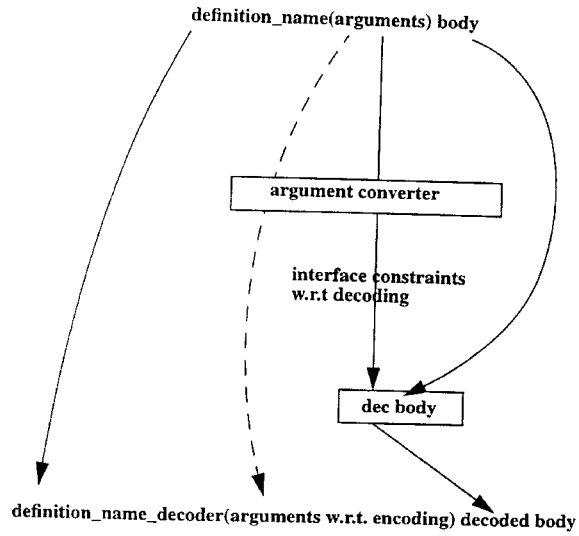

FIGURE 6. Compiling the information element/PDU definition into decoding function

4.2 Constraint and body

4.2.1 Encoding (enc body)

The compilation shall be illustrated in fig. 7. The current constraint shall be merged with the constraint of the body (= constraint + block) and the compilation proceeds with a new constraint. The module *enc block* shall be illustrated in section 4.3.1 on page 15. The module *mac* is being illustrated in section 3.20 on page 11.

Appendix - 2

FIGURE 7. Compiling the constraint-sequence pair

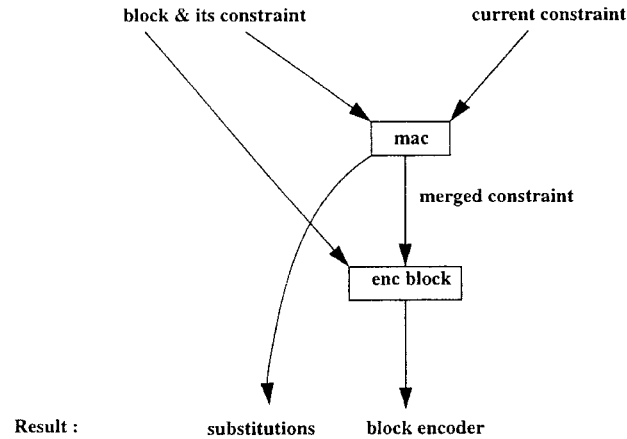

4.2.2 Decoding (dec body)

The compilation shall be illustrated in fig. 8. The current constraint shall be merged with the constraint of the body (= constraint + block) and the compilation proceeds with a new constraint. The module *dec block* shall be illustrated in section 4.3.2 on page 16. The module *mac* is being illustrated in section 3.20 on page 11.

FIGURE 8. Compiling the constraint-sequence pair

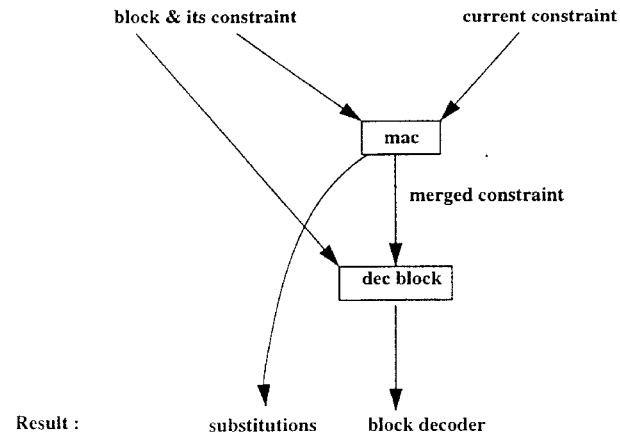

Appendix - 2

4.3 Block

4.3.1 Encoding (enc block)

The compilation shall be illustrated in fig. 9. The head and tail of the sequence shall be compiled sequentially, by updating the constraint set. The definition is recursive. A is a TSN primitive. Encodings for the primitives (function·enc) shall be defined in sections 4.4-4.11.

FIGURE 9. Compiling the block A, B. A is a primitive ("head") and B is a block ("tail").

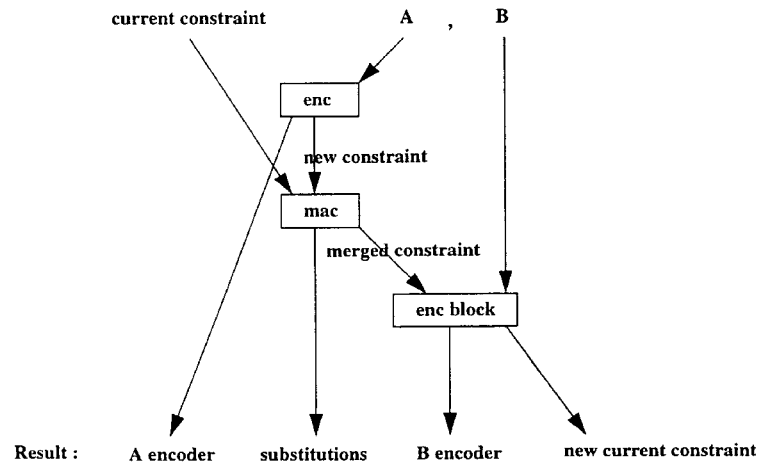

4.3.2 Decoding (dec block)

The compilation shall be illustrated in fig. 10. The head and tail of the sequence shall be compiled sequentially, by updating the constraint set. The definition is recursive. A is a TSN primitive. Decodings for the primitives (function enc) shall be defined in sections 4.4-4.11.

FIGURE 10. Compiling the block A, B. A is a primitive and B is a block.

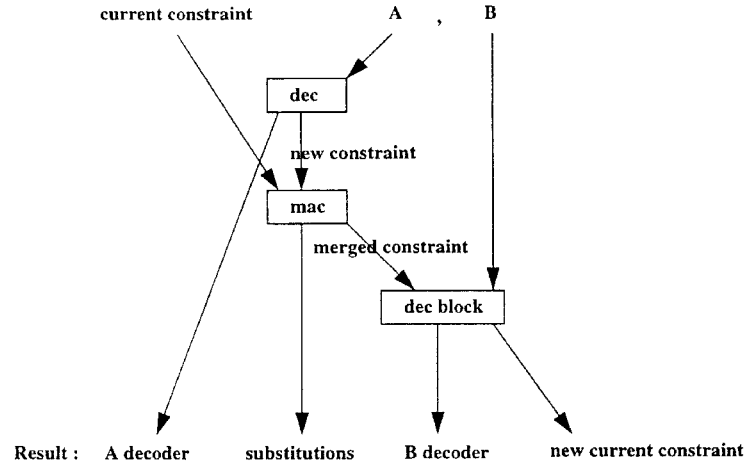

4.4 Bitfield

4.4.1 Encoding

The compilation shall be illustrated in fig. 11 and 12. If a variable is non-ground, the primitive will be lifted to the constraint set to wait a retrospective encoding. If possible, the encoding will be done by generating a special throw primitive. The throw will be generated by the Corresponding catch will catch the bitfield.

FIGURE 11. Compiling the bitfield primitive

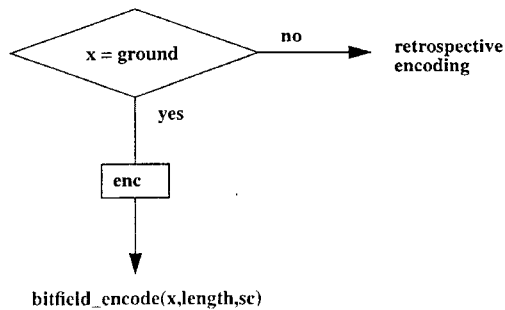

FIGURE 12. Retrospective encoding
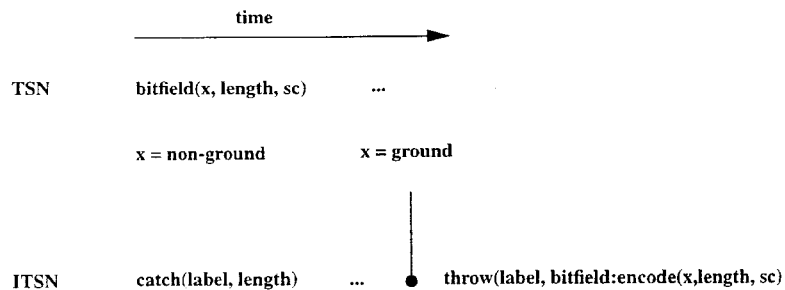
4.4.2 Decoding
The compilation shall be illustrated in fig. 13.
FIGURE 13. Compiling the bitfield primitive.
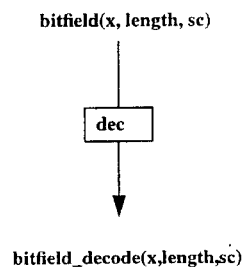
4.5 Marker
4.5.1 Encoding
The compilation shall be illustrated in fig. 14.
FIGURE 14. Compiling the marker primitive.
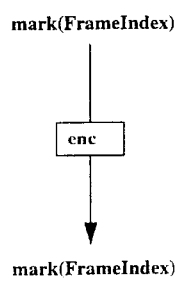
Appendix - 2

4.5.2 Decoding

The compilation shall be illustrated in fig. 15.

FIGURE 15. Compiling the marker primitive.

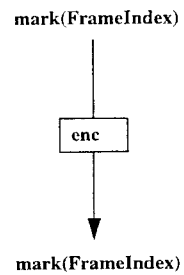

4.6 Layout

4.6.1 Encoding

Result of the encoding compilation of the layout primitive is the primitive itself.

4.6.2 Decoding

Result of the decoding compilation of the layout primitive is the primitive itself.

4.7 Filler bits

4.7.1 Encoding

Result of the encoding compilation of the filler primitive is the primitive itself.

4.7.2 Decoding

Result of the decoding compilation of the filler primitive is the primitive itself.

4.8 Conditional primitive

When compiling, the condition of the conditional primitive should be ground. The threads of the primitive shall be compiled separately, only the result constraints should be merged disjunctively. The result constraint of the disjunction will be the return constraint (for the primitive sequence compiler, for instance).

4.8.1 Encoding
FIGURE 16. Compiling the conditional primitive
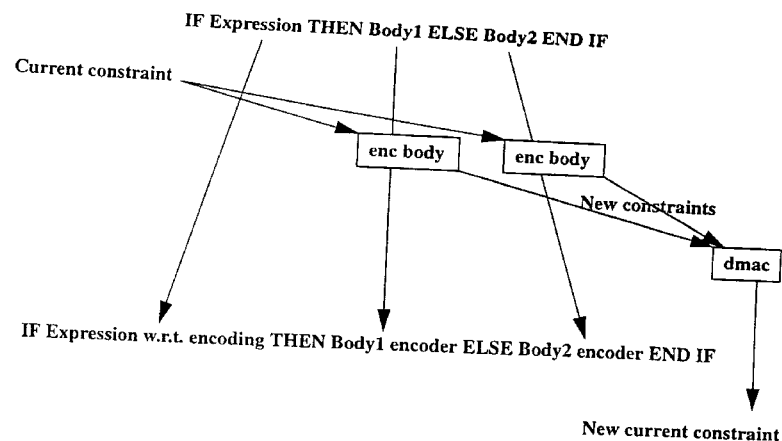
4.8.2 Decoding
FIGURE 17. Compiling the conditional primitive
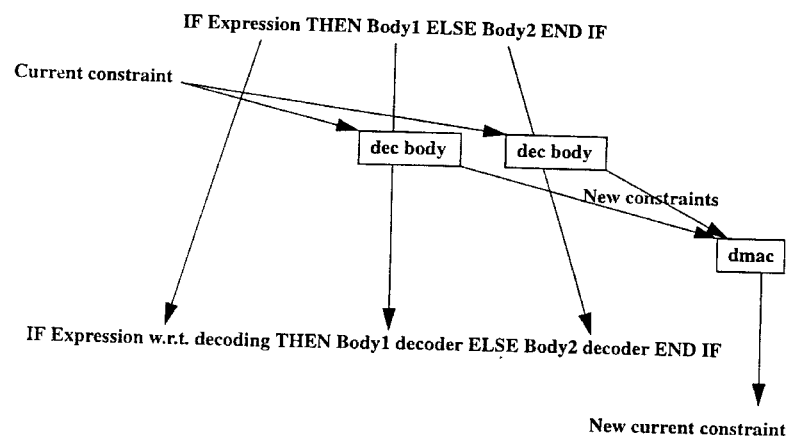

4.9 Loop primitive

4.9.1 Encoding

The compilation of the body of the loop primitive shall be illustrated in fig. 18. The precondition for the loop is that *var*, *cond* and *index-val* should be ground. The encoding does not result in any additional constraints.

FIGURE 18. Compiling the body of the loop primitive

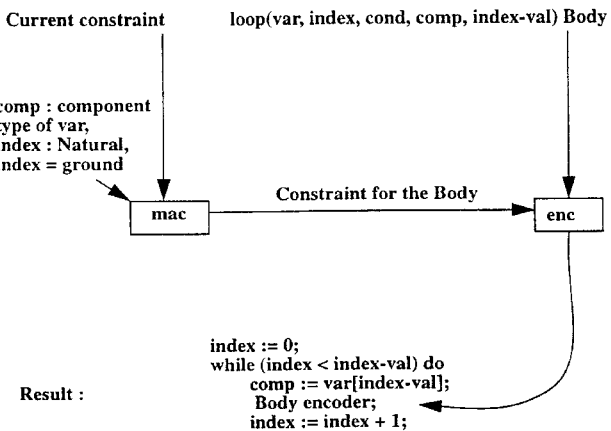

4.9.2 Decoding

The compilation of the body of the loop primitive shall be illustrated in fig. 18. The precondition for the loop is that *cond* and *index-val* should be ground and *var* should be non-ground. The compilation grounds the *var* variable.

FIGURE 19. Compiling the body of the loop primitive

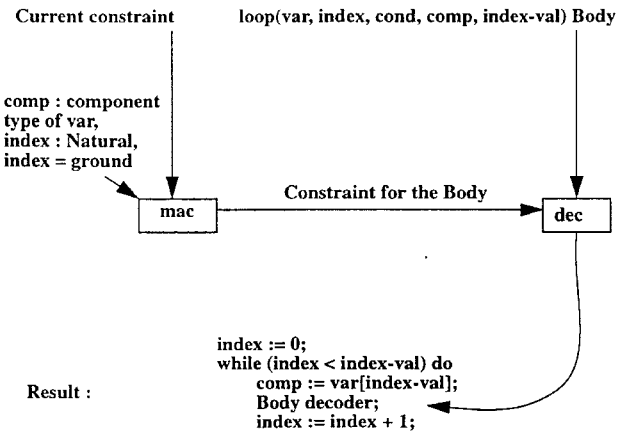

4.10 Coding separator

4.10.1 Encoding

The encoding of the coding separator is the encoding of its first argument.

4.10.2 Decoding

The decoding of the coding separator is the decoding of its first argument.

4.11 Information element and PDU references

4.11.1 Encoding

The compilation of the information element/PDU reference is the call of the encoder. The precondition for the compilation is that the argument modes are in line with the current constraint set w.r.t. encoding semantics.

4.11.2 Decoding

The compilation of the information element/PDU reference is the call of the decoder. The precondition for the compilation is that the argument modes are in line with the current constraint set w.r.t. decoding semantics.

4.12 Example

The following example illustrates the power of compilation rules. The compilation starts with the rule presented at 4.1.

EXAMPLE 4. Compiling the encoder from the information element definition.
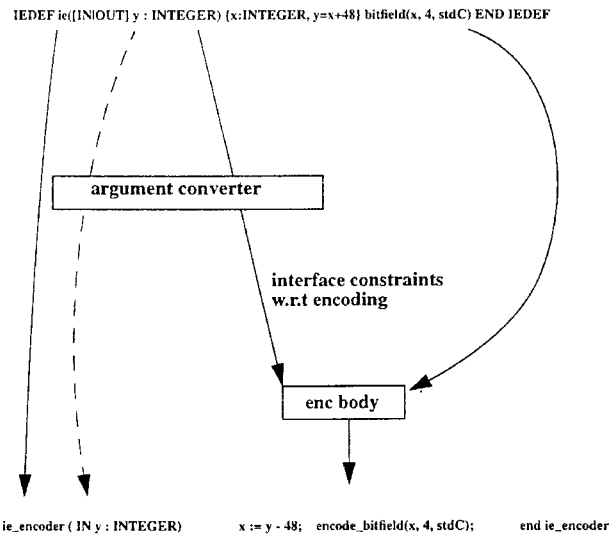
EXAMPLE 5. Compiling the decoder from the information element definition.
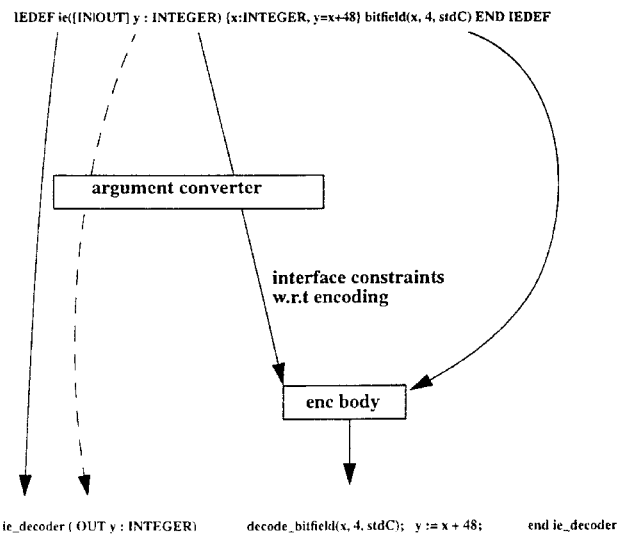
Appendix - 2

5.0 Back-end Compiler

The static analysis results in syntax tree describing the encoding/decoding function. The back-end compiler has to be used for converting the syntax trees to the appropriate programming environment.

5.1 BEPI

Back-end programming interface (BEPI) defines an API for the encoder/decoder syntax trees. Currently, there exists only an interface written in prolog. The prolog BEPI is a part of the NRC TSN prototype.

5.2 Frame index approximation

The TSN language does not fix the positions of the bitfields in the frames while in transit. However, it could be useful to approximate the bitfield positions at compile-time. This results in more efficient and specialized code, which is prepared only to the possible bitfield sequences.

Let us recall the definition of Offset:

```
Offset ::= INTEGER (0 .. 7)
```

The operations $\wedge$ (conjunction) and $\vee$ (disjunction) shall be defined in definition 16.

DEFINITION 16. Offset conjunction and disjunction. Let $x$ and $y$ be Offset sets. Then
$x \wedge y = mod(x+y, 8)$ and
$x \vee y = x \cup y$.

Note that the conjunction and disjunction shall be calculated between all possible solutions.

EXAMPLE 6. Offset conjunction and disjunction.
$1 \wedge 2 = 3$
$5 \wedge 3 = 0$
$\{1,3\} \wedge 6 = \{7,1\}$
$1 \vee 2 = \{1,2\}$
$\{1,2\} \vee \{2,5\} = \{1,2,5\}$ A very simple approximation for the byte counter can also be used:

DEFINITION 17. Byte position approximation: conjunction and disjunction. Let the domain be $D = INTEGER \cup unknown$, and let $x, y \in D$. Now, the conjunction and disjunction shall be defined as follows: $x \wedge y = x + y$, when $x, y \in INTEGER$. Also, $x \wedge unknown = unknown$. The disjunction is $x \vee x = x$, and $x \vee y = unknown$, when $x \neq y$.

EXAMPLE 7. The domains of offset, and byte position approximation can be composed together. Some examples:

$$\langle 1,2\rangle \wedge \langle 2,3\rangle = (3,5)$$
$$(unknown, \{0,3\}) \wedge (3,5) = (unknown, \{3,5\})$$
$$(1,2) \vee (2,2) = (unknown, 2)$$

5.3 API document generator

When generating documents to protocol programmers, some back-end specific information may be needed. Thus, it could be useful to define a mechanism of calling back-end-specific document generators from the TSN frontend (visual editor).

6.0 GUI

The visual editor may be structured as follows (proposal):

```
1    protocol-name
2        document
3            overview
4            specification reference list
5            (www-site reference list?)
6        user
7            functions
8            IE's
9            PDU's
10       definitions
11           internal standard reference
12           imports (external protocols)
13           constants
14           functions
15           IEs
16           PDUs
17           main PDU
18       test manager. It is a structure of:
19           frame
20           values
21           frame-value pairs
```

Appendix - 2

TRANSFER SYNTAX NOTATION

APPENDIX - 3

EXAMPLES

1.0 Introduction

1.1 Objective

The objective of this document is to illustrate the expressive power of the TSN programming language [3].

1.2 References

[1]  TS GSM 04.08 (prETS 300 557): "European digital cellular telecommunications system (Phase 2); Mobile radio interface layer 3 specification".

[2]  IS-136.1

[3]  Specification of Transfer Syntax Notation (TSN). Nokia Research Center, 1996.

1.3 The structure of this document

The chapter 2 illustrates the examples taken from GSM and DAMPS protocols.

1.4 Conventions used in this document

The examples are illustrated in both graphical and textual formats. The visual format is in line with the visual primitives defined in [3]. The textual representation consists of ASN.1 type definitions and TSN codec definitions.

2.0 Examples

2.1 GSM examples

EXAMPLE 1. GSM 04.08/10.5.1.1 Cell identity (coding of simple integer type)

Interface:    cell_identity(x : INTEGER)

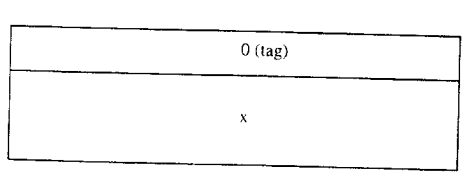

```
1   PRIVATE IEDEF cell_identity(x : INTEGER)
2       bitfield(0, 8, stdC),
3       bitfield(x, 16, stdC)
4   END IEDEF
```

EXAMPLE 2. GSM 04.08/10.5.2.21a Mobile time difference (constant length field)

Interface:    mobile_time_difference(x : INTEGER)

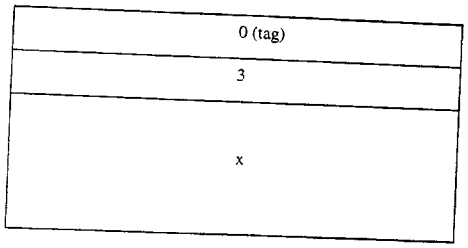

```
1    PRIVATE IEDEF mobile_time_difference(x : INTEGER)
2        bitfield(0, 8, stdC),
3        bitfield(3, 8, stdC),      -- constant value length field
4        bitfield(x, 24, stdC)
5    END IEDEF
```

EXAMPLE 3. GSM 04.08/10.5.2.31 RR cause (enumerated type)

Interface:    rr_cause(x : RR_cause)

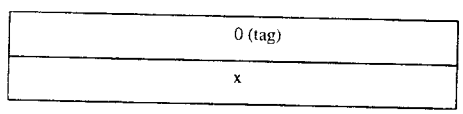

```
1    RR_cause ::= ENUMERATED {
2        normal_event (0),
3        abnormal_release_unspecified (1),
4        abnormal_release_channel_unacceptable (2),
5        -- ... and many other values
6        protocol_error_unspecified (111)
7    }
8
9    PRIVATE IEDEF rr_cause(x : RR_cause)
10       bitfield(0, 8, stdC),
11       bitfield(x, 8, stdC)
12   END IEDEF
```

EXAMPLE 4. GSM 04.08/10.5.1.4 Mobile identity (more complicated relations between bitfields: length field, odd/even indicator)

Interface:    mobile_identity(x : MobileIdentity)
Constraints:
- len, digitsLen, oddEven : INTEGER
- [ oddEven = if odd(digitsLen) then 1 else 0,
- digitsLen = length(x.digits),
- len = digitsLen div 2 + 1 ]
- digitsLen = 2 * len - 2 + oddEven ]

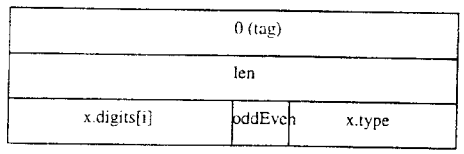

```
    MobileIdentity ::= SEQUENCE {
```

```
 2       type ENUMERATED (IMSI(1), IMEI(2), IMEISV(3), TMSI(4), no_identity(0)},
 3       digits HEXSTRING
 4  }
 5
 6  PRIVATE IEDEF mobile_identity(x : MobileIdentity)
 7       (len : INTEGER,
 8       digitsLen : INTEGER,
 9       oddEven : INTEGER,
10       [digitsLen = length(x.digits) | digitsLen = (((2 * len) - 2) + oddEven)],
11       oddEven = if odd(digitsLen) then 1 else 0,
12       len = ((digitsLen div 2) + 1))
13       bitfield(0, 8, stdC),
14       bitfield(len, 8, stdC),
15       layout("><"),                         -- choose direction R->L
16       bitfield(x.type, 3, stdC),
17       bitfield(oddEven, 1, stdC),
18       LOOP(x.digits, i, i < digitsLen, aDigit, i)
19           bitfield(x.digits[i], 4, stdC)
20       END LOOP,
21       filler(1, 0),
22       layout(">>")                          -- original direction L->R
23  END IEDEF
```

EXAMPLE 5. GSM 04.08/10.5.2.42 TMSI

Interface:    tmsi(x : TMSI)

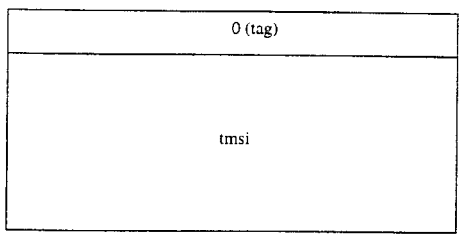

```
1  TMSI ::= OCTET STRING (SIZE (4))
2  PRIVATE IEDEF tmsi(x : TMSI)
3       bitfield(0, 8, stdC),
4       bitfield(tmsi, 32, octetstringC)
5  END IEDEF
```

EXAMPLE 6. GSM 04.08/10.5.1.5 Classmark 1 (sequence type)

Interface:    classmark_1(x : Classmark_1)

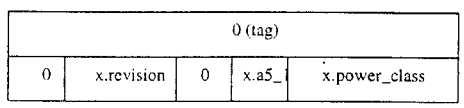

```
1  Classmark_1 ::= SEQUENCE {
2       revision ENUMERATED {phase1(0), phase2(1)},
3       a5_1 ENUMERATED {available(0), not_available(1)},
4       power_class RF_power_capability}
5  RF_power_capability ::= ENUMERATED {
6       pwr_cl1(0),
7       pwr_cl2(1),
8       pwr_cl3(2),
```

Appendix - 3

```
9       pwr_c14(3),
10      pwr_c15(4)}
11
12 PRIVATE IEDEF classmark_1(x : Classmark_1)
13      bitfield(0, 8, stdC),        -- tag
14      bitfield(0, 1, stdC),        -- spare bit
15      bitfield(x.revision, 2, stdC),
16      bitfield(0, 1, stdC),        -- spare bit
17      bitfield(x.a5_1, 1, stdC),
18      bitfield(x.power_class, 3, stdC)
19 END IEDEF
```

EXAMPLE 7. GSM 04.08/10.5.1.2 Ciphering key sequence number (length less than 1 byte)

Interface:    ciphering_key_sequence_number(x : INTEGER)

```
1 PRIVATE IEDEF ciphering_key_sequence_number(x : INTEGER)
2       bitfield(0, 1, stdC),        -- spare bit
3       bitfield(x, 3, stdC)
4 END IEDEF
```

EXAMPLE 8. GSM 04.08/10.5.2.1b Cell channel description (choice type)

Interface:    bitstring(x : BoolSeq, IN size : INTEGER)

```
1 BoolSeq ::= SEQUENCE OF BOOLEAN
2 PRIVATE IEDEF bitstring(x : BoolSeq, IN size : INTEGER)
3       LOOP(x, i, i < size, bit, size-1-i)
4           bitfield(bit, 1, stdC)
5       END LOOP
6 END IEDEF
```

Interface:    cell_channel_description(x : Cell_channel_description)

Appendix - 3

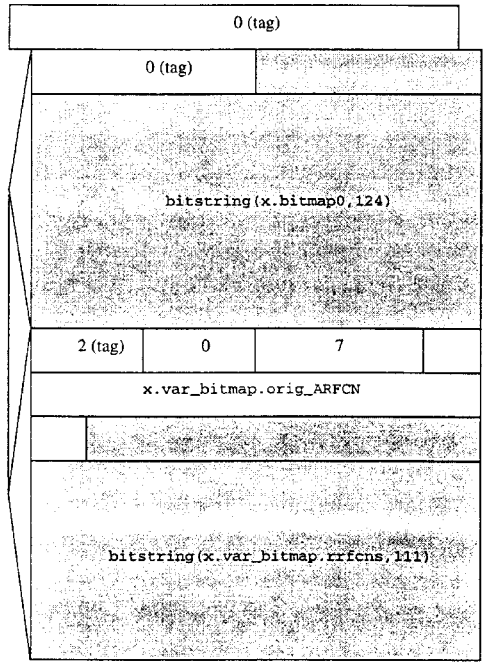

```
1   Cell_channel_description ::= CHOICE {
2       bitmap0     Cell_ARFCNs,
3       var_bitmap  SEQUENCE {orig_ARFCN ARFCN, rrfcns Cell_RRFCNs}
4   }
5   -- Bit map 0 format
6   Cell_ARFCNs ::= SEQUENCE SIZE (124) OF BOOLEAN
7   -- Variable bit map format
8   Cell_RRFCNs ::= SEQUENCE SIZE (111) OF BOOLEAN
9
10  PRIVATE IEDEF bitstring(x : BoolSeq, IN size : INTEGER)
11      LOOP(x, i, i < size, bit, size-1-i)
12          bitfield(bit, 1, stdC)
13      END LOOP
14  END IEDEF
15
16  PRIVATE IEDEF cell_channel_description(x : Cell_channel_description)
17      bitfield(0, 8, stdC),                           -- tag
18      IF [present(x, "bitmap0") | peep(0, 2) = 0] THEN    -- bit map 0 format
19          bitfield(0, 4, stdC),
20          bitstring(x.bitmap0, 124)
21      ELSE                                            -- general format
22          bitfield(2, 2, stdC),           -- FORMAT ID
23          bitfield(0, 2, stdC),           -- spare
24          bitfield(7, 3, stdC),           -- FORMAT ID
25          bitfield(x.var_bitmap.orig_ARFCN, 10,.stdC),
```

Appendix - 3

```
26        bitstring(x.var_bitmap.rrfcns, 111)
27     END IF
28 END IEDEF
```

2.2 DAMPS examples

EXAMPLE 9. IS-136.1 Additional DCCH Information

Interface: additionalDCCHinformation(x:AdditionalDCCHinformation)
Constraints:
- len : INTEGER
- len = length(x) - 1

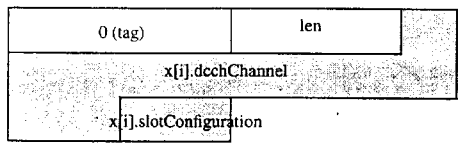

```
1  AdditionalDCCHinformation ::= SEQUENCE OF SEQUENCE {
2      dcchChannel INTEGER,
3      slotConfiguration INTEGER
4  }
5
6  -- TSN definition
7  IEDEF additionalDCCHinformation(x:AdditionalDCCHinformation)
8      {len:INTEGER, len=(length(x)-1)}
9      bitfield(0, 4, stdC),
10     bitfield(len, 3, stdC),
11     LOOP(x, i, i<(len+1), component, i)
12         bitfield(component.dcchChannel, 11, stdC),
13         bitfield(component.slotConfiguration, 2, stdC)
14     END LOOP
15 END IEDEF
```

EXAMPLE 10. IS-136.1 Data privacy mode map

Interface: dataPrivacyModeMap(x:INTEGER)
Constraints:
- y : INTEGER
- [ y = if (x = 0) then 0 else if (x = 1) then 1 else 8 |
  x = if (y = 0) then 0 else if ((y mod 2) = 1) then 1 else 2 ]

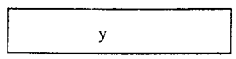

EXAMPLE 11. IS-136.1 Message encryption algorithm

Interface: messageEncryptionAlgorithmMap(x:EncryptionAlgs)
Constraints:
- a, b, c, d, e, f, g, h:INTEGER
- a = if (present(x, "a")) then 1 else 0
- b = if (present(x, "b")) then 1 else 0
- c = if (present(x, "c")) then 1 else 0
- d = if (present(x, "d")) then 1 else 0
- e = if (present(x, "e")) then 1 else 0
- f = if (present(x, "f")) then 1 else 0
- g = if (present(x, "g")) then 1 else 0

• h = if (present(x, "h")) then 1 else 0

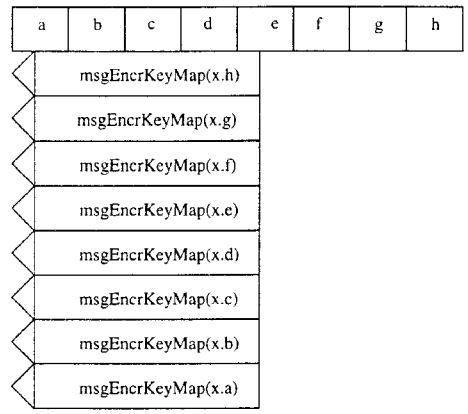

```
1    EncryptionAlgs ::= SEQUENCE {
2         a INTEGER OPTIONAL,
3         b INTEGER OPTIONAL,
4         c INTEGER OPTIONAL,
5         d INTEGER OPTIONAL,
6         e INTEGER OPTIONAL,
7         f INTEGER OPTIONAL,
8         g INTEGER OPTIONAL,
9         h INTEGER OPTIONAL
10   }
11
12   -- TSN representation
13   IEDEF messageEncryptionAlgorithmMap(x:EncryptionAlgs)
14        (a:INTEGER, b:INTEGER, c:INTEGER, d:INTEGER,
15         e:INTEGER, f:INTEGER, g:INTEGER, h:INTEGER,
16         a = if (present(x, "a")) then 1 else 0,
17         b = if (present(x, "b")) then 1 else 0,
18         c = if (present(x, "c")) then 1 else 0,
19         d = if (present(x, "d")) then 1 else 0,
20         e = if (present(x, "e")) then 1 else 0,
21         f = if (present(x, "f")) then 1 else 0,
22         g = if (present(x, "g")) then 1 else 0,
23         h = if (present(x, "h")) then 1 else 0}
24         bitfield(h, 1, stdC),
25         bitfield(g, 1, stdC),
26         bitfield(f, 1, stdC),
27         bitfield(e, 1, stdC),
28         bitfield(d, 1, stdC),
29         bitfield(c, 1, stdC),
30         bitfield(b, 1, stdC),
31         bitfield(a, 1, stdC),
32         IF (h=1) THEN
33             msgEncrKeyMap(x.h)
34         END IF,
35         IF (g=1) THEN
36             msgEncrKeyMap(x.g)
37         END IF,
38         IF (f=1) THEN
39             msgEncrKeyMap(x.f)
40         END IF,
41         IF (e=1) THEN
42             msgEncrKeyMap(x.e)
```

Appendix - 3

```
43      END IF,
44      IF (d=1) THEN
45          msgEncrKeyMap(x.d)
46      END IF,
47      IF (c=1) THEN
48          msgEncrKeyMap(x.c)
49      END IF,
50      IF (b=1) THEN
51          msgEncrKeyMap(x.b)
52      END IF,
53      IF (a=1) THEN
54          msgEncrKeyMap(x.a)
55      END IF
56  END IEDEF
```

Interface: msgEncrKeyMap(x:INTEGER)
Constraints:
- y : INTEGER
- [ y = if (x = 0) then 0 else if (x = 1) then 1 else 8 |
  x = if (y = 0) then 0 else if ((y mod 2) = 1) then 1 else 2 ]

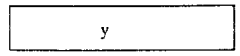

```
57  IEDEF msgEncrKeyMap(x:INTEGER)   -- simplification: Enumerated better
58      {y:INTEGER,
59       y = if (x=0) then 0
60           else if (x=1) then 1
61           else 8,
62       x = if (y=0) then 0
63           else if ((x mod 2) = 1) then 1
64           else 2}
65       bitfield(y, 4, stdC)
66  END IEDEF
```

EXAMPLE 12. IS-136.1 MSID assignment

Interface: msidAssignment(x:MSIDassignment)
Constraints:
- idt : INTEGER
- idt = if (present(x, "tmsi20")) then 0 else 1

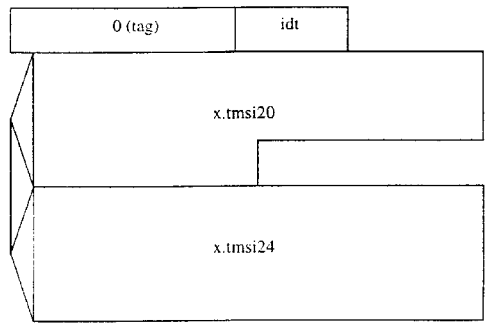

```
1  MSIDassignment ::= CHOICE {
2      tmsi20 INTEGER,
3      tmsi24 INTEGER
4  }
```

```
 5
 6  -- TSN representation
 7  IEDEF msidAssignment(x:MSIDassignment)  -- x:TMSI number
 8      {idt : INTEGER, idt = if (present(x, "tmsi20")) then 0 else 1}
 9      bitfield(0, 4, stdC),
10      bitfield(idt, 2, stdC),
11      IF (idt = 0) THEN
12          bitfield(x.tmsi20, 20, stdC)
13      ELSE
14          bitfield(x.tmsi24, 24, stdC)
15      END IF
16  END IEDEF
```

EXAMPLE 13. IS-136.1 Neighbor cell

Interface: neighborCell(x:NeighborCell)
Constraints:
- ind : INTEGER
- ind = if (length(x.psidRsid) > 0) then 1 else 0

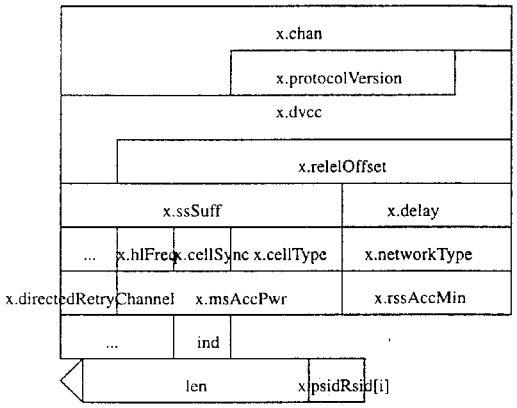

```
 1  NeighborCell ::= SEQUENCE {
 2      chan, INTEGER,              -- Enumerated types could be more
 3      protocolVersion INTEGER,    -- convenient. However, the integer
 4      dvcc INTEGER,               -- types are used due to simplicity.
 5      relelOffset INTEGER,
 6      ssSuff INTEGER,
 7      delay INTEGER,
 8      hlFreq INTEGER,
 9      cellSync INTEGER,
10      cellType INTEGER,
11      networkType INTEGER,
12      directedRetryChannel INTEGER,
13      msAccPwr INTEGER,
14      rssAccMin INTEGER,
15      psidRsid BIT STRING
16  }
17
18  -- TSN representation
19  IEDEF neighborCell(x:NeighborCell)
20      {ind:INTEGER, ind=if(length(x.psidRsid)>0) then 1 else 0}
21      bitfield(x.chan, 11, stdC),
22      bitfield(x.protocolVersion, 4, stdC),
23      bitfield(x.dvcc, 8, stdC),
```

```
24      bitfield(x.relelOffset, 7, stdC),
25      bitfield(x.ssSuff, 5, stdC),
26      bitfield(x.delay, 4, stdC),
27      bitfield(x.hlFreq, 1, stdC),
28      bitfield(x.cellSync, 1, stdC),
29      bitfield(x.cellType, 2, stdC),
30      bitfield(x.networkType, 3, stdC),
31      bitfield(x.directedRetryChannel, 1, stdC),
32      bitfield(x.msAccPwr, 4, stdC),
33      bitfield(x.rssAccMin, 5, stdC),
34      bitfield(ind, 1, stdC),
35      IF (ind = 1) THEN
36          {len:INTEGER, len=length(x.psidRsid)}
37          bitfield(len, 4, stdC),
38          LOOP(x.psidRsid, i, i<len, psidRsid, i)
39              bitfield(psidRsid, 1, stdC)
40          END LOOP
41      END IF
42  END IEDEF
```

EXAMPLE 14. IS-136.1 PSID/RSID Available

Interface:    psidrsidAvailable(x:PSIDRSIDlist)
Constraints:
- num : INTEGER
- num = length(x) - 1

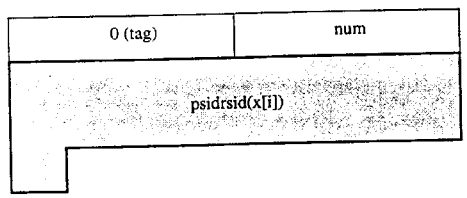

```
1   PSIDRSIDlist ::= SEQUENCE OF PSIDRSID
2
3   -- TSN definition
4   IEDEF psidrsidAvailable(x:PSIDRSIDlist)
5       {num : INTEGER,
6        num = (length(x) - 1)}
7       bitfield(0, 4, stdC),
8       bitfield(num, 4, stdC),
9       LOOP(x, i, i<(num + 1), component, i)
10          psidrsid(component)
11      END LOOP
12  END IEDEF
```

Interface:    psidrsid(x:PSIDRSID)
Constraints:
- type : INTEGER
- type = if (present(x, "psid")) then 0 else 1

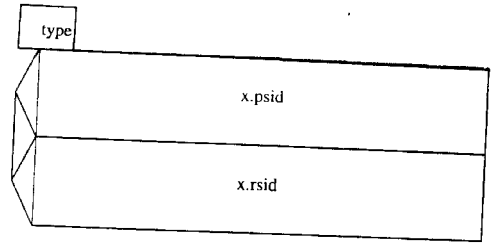

```
1  PSIDRSID ::= CHOICE {
2      psid INTEGER,
3      rsid INTEGER
4  }
5
6  -- TSN Definition
7  IEDEF psidrsid(x:PSIDRSID)
8      {type : INTEGER,
9       type = if(present(x,"psid")) then 0 else 1}
10     bitfield(type, 1, stdC),
11     IF (type = 0) THEN
12         bitfield(x.psid, 16, stdC)
13     ELSE
14         bitfield(x.rsid, 16, stdC)
15     END IF
16 END IEDEF
```

EXAMPLE 15. IS-136.1 STM Measurement

Interface:   stmMeasurement(x:STMlist)
Constraints:
- num : INTEGER
- num = length(x) - 1

```
1  STMlist ::= SEQUENCE OF INTEGER
2
3  -- TSN definition
4  IEDEF stmMeasurement(x:STMlist)
5      {num : INTEGER,
6       num = (length(x) - 1)}
7      bitfield(0, 4, stdC),
8      bitfield(num, 4, stdC),
9      loop(x, i, i<(num + 1), {omit(x, i)},
10         bitfield(x[i], 5, stdC))
11 END IEDEF
```

EXAMPLE 16. IS-136.1 TDMA Service Information

Interface:   tdmaServiceInfo(x:TDMAserviceInfo)
Constraints:
- num : INTEGER
- num = length(x) - 1

| 0 (tag) | num |
|---|---|
| ... | tdmaServiceMap(x[i]) |

```
1   STMlist ::= SEQUENCE OF INTEGER
2
3   -- TSN definition
4   IEDEF tdmaServiceInfo(x:TDMAserviceInfo)
5       {num : INTEGER, num = (length(x) - 1)}
6       bitfield(0, 4, stdC),
7       bitfield(num, 5, stdC),
8       LOOP(x, i, i<(num + 1), component, i)
9           tdmaServiceMap(component)
10      END LOOP
11  END IEDEF
```

Interface:   tdmaServiceMap(x:INTEGER)
Constraints:
- presenceBit : INTEGER
- presenceBit = if (x != 0) then 1 else 0

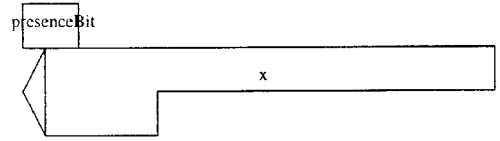

```
1   IEDEF tdmaServiceMap(x:INTEGER)
2       {presenceBit: INTEGER,
3        presenceBit = if (x != 0) then 1 else 0}
4       bitfield(presenceBit, 1, stdC),
5       IF (presenceBit = 1) THEN
6           bitfield(x, 10, stdC)
7       END IF
8   END IEDEF
```

Appendix - 3

What is claimed is:

1. A method for generation of code for direction of a digital signal processor in a communications system operative in response to constraints of signal transmission protocol, comprising:

evaluating protocol and syntax to be employed by the communications system for transmission of a message by a sequence of bytes having equal bit length;

generating a graphical representation of bit streams having the protocol and the syntax, the graphical representation having blocks for elements of the message;

converting the graphical representation to a set of declarations in accordance with a declarative form of Transfer Syntax Notation (TSN) language;

operating a compiler system which includes a running of a TSN compiler program to convert the declarative form of the TSN language to obtain a host language which is convertible to machine language for operation of the digital signal processor.

2. A method according to claim 1 wherein said drafting step includes a step of providing encoding and decoding functions in accordance with the declarative form of the TSN language.

3. A method according to claim 1 wherein said set of declarations includes a range of numerical values for each of said message elements.

4. A method according to claim 1 wherein, in said graphical representation, there is a separate block for each of respective ones of said message elements.

5. A method according to claim 1 wherein said operating step includes running the TSN compiler program to convert the declarative form of the TSN language to an imperative form of the TSN language; and compiling the imperative form of the TSN language to the host language.

6. A system for generating code capable of driving a digital signal processor in a communications system operative in response to constraints of signal transmission protocol, comprising:

a computer system having a display presenting a series of blocks representative of elements of a message, the message being governed by communications protocol and syntax for transmission of the message by a sequence of bytes having equal bit length;

means for entering data into said computer system, said data including identification of various message elements for inclusion in respective ones of said blocks on said display to generate a graphical representation of bit streams of the message having the protocol and the syntax, said data further including protocol and syntax constraints to be employed by the communications system for transmission of the message;

wherein said computer system is operative to convert the graphical representation to a set of declarations of a declarative form of Transfer Syntax Notation (TSN) language; and said computer system comprises means for running a TSN program to provide a conversion of the declarative form of the TSN language to a host language, the host language being convertible to machine language for operation of the digital signal processor.

7. A code generation system according to claim 6 wherein said running means includes means for converting the declarative form of the TSN language to an imperative form of the TSN language; and said computer system further comprises a compiler of the imperative form of the TSN language to output the host language.

8. A code generation system according to claim 6 wherein said running means is operative with encoding and decoding functions provided in the declarative form of the TSN language.

9. A code generation system according to claim 6 wherein said data entry means provides for entry of a range of numerical values in said set of declarations for each of said message elements, said set of numerical values serving to identify constraints of protocol and syntax.

10. A code generation system according to claim 6 wherein, in said graphical representation, there is a separate block for each of respective ones of said message elements.

11. A code generation system according to claim 10 wherein said data entry means provides for entry of alphanumerics, including numerals of the range of numerical values, into respective ones of said blocks.

* * * * *